(12) United States Patent
Shiplacoff et al.

(10) Patent No.: US 8,683,362 B2
(45) Date of Patent: *Mar. 25, 2014

(54) CARD METAPHOR FOR ACTIVITIES IN A COMPUTING DEVICE

(75) Inventors: Daniel Marc Gatan Shiplacoff, Los Angeles, CA (US); Matias Gonzalo Duarte, Sunnyvale, CA (US); Jeremy Godfrey Lyon, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 807 days.

This patent is subject to a terminal disclaimer.

(21) Appl. No.: 12/416,279

(22) Filed: Apr. 1, 2009

(65) Prior Publication Data

US 2010/0095240 A1    Apr. 15, 2010

Related U.S. Application Data

(63) Continuation-in-part of application No. 12/126,145, filed on May 23, 2008.

(51) Int. Cl.
*G06F 3/048* (2013.01)
*G06F 3/033* (2013.01)

(52) U.S. Cl.
USPC ........... 715/767; 715/784; 715/792; 715/802; 715/863

(58) Field of Classification Search
USPC .................... 715/767, 784, 792, 802, 863
See application file for complete search history.

(56) References Cited

U.S. PATENT DOCUMENTS

| 4,680,577 | A |   | 7/1987 | Straayer et al. |
| 5,146,556 | A | * | 9/1992 | Hullot et al. ................. 715/790 |
| 5,499,330 | A | * | 3/1996 | Lucas et al. ................. 715/205 |
| 5,574,846 | A |   | 11/1996 | Yoshimura et al. |

(Continued)

FOREIGN PATENT DOCUMENTS

| AU | 2008100003 A4 | 2/2008 |
| CN | 1896921 A | 1/2007 |

(Continued)

OTHER PUBLICATIONS

Moyle, Michael et al., "The Design and Evaluation of a Flick Gesture for 'Back' and 'Forward' in Web Browsers," Proceedings of the Fourth Australasian user interface conference on User interfaces 2003, vol. 18, Australian Computer Society, Inc. Darlinghurst, Australia, copyright 2003, ISBN:0-909925-96-8. 8 pages.*

(Continued)

*Primary Examiner* — Doon Chow
*Assistant Examiner* — Wilson Varga
(74) *Attorney, Agent, or Firm* — Mahmedi Paradice Kreisman LLP

(57) ABSTRACT

In various embodiments, a card metaphor is established, in which each activity can be represented within an area of the screen referred to as a card. In various embodiments, any of several display modes are available for viewing, interacting with, manipulating, initiating, and dismissing cards. A persistent positional relationship can be established among cards, represented by a one-dimensional sequence. Newly opened cards are generally placed at the end of the sequence, although a new card that bears a relationship to an already open card may, in some embodiments, be placed adjacent to the already open card. In various embodiments, cards may be grouped, with such groups being represented as stacks of cards or by other visually distinctive means.

20 Claims, 24 Drawing Sheets

(56) References Cited

U.S. PATENT DOCUMENTS

| | | | | |
|---|---|---|---|---|
| 5,586,244 | A * | 12/1996 | Berry et al. | 715/788 |
| 5,675,361 | A | 10/1997 | Santilli | |
| 5,677,708 | A * | 10/1997 | Matthews et al. | 345/684 |
| 6,011,537 | A | 1/2000 | Slotznick | |
| 6,061,050 | A | 5/2000 | Allport et al. | |
| 6,323,846 | B1 | 11/2001 | Westerman et al. | |
| 6,407,757 | B1 | 6/2002 | Ho | |
| 6,441,811 | B1 | 8/2002 | Sawada et al. | |
| 6,570,557 | B1 | 5/2003 | Westerman et al. | |
| 6,590,593 | B1 * | 7/2003 | Robertson et al. | 715/782 |
| 6,600,936 | B1 | 7/2003 | Karkkainen et al. | |
| 6,613,100 | B2 * | 9/2003 | Miller | 715/273 |
| 6,677,932 | B1 | 1/2004 | Westerman | |
| 6,680,677 | B1 | 1/2004 | Tiphane | |
| 6,686,906 | B2 | 2/2004 | Salminen et al. | |
| 6,765,559 | B2 | 7/2004 | Hayakawa | |
| 6,924,789 | B2 | 8/2005 | Bick | |
| 6,992,658 | B2 | 1/2006 | Wu et al. | |
| 7,030,861 | B1 | 4/2006 | Westerman et al. | |
| 7,051,291 | B2 * | 5/2006 | Sciammarella et al. | 715/838 |
| 7,151,528 | B2 | 12/2006 | Taylor et al. | |
| 7,159,176 | B2 | 1/2007 | Billmaier et al. | |
| 7,170,500 | B2 | 1/2007 | Canova, Jr. | |
| 7,352,363 | B2 | 4/2008 | Coates et al. | |
| 7,360,166 | B1 * | 4/2008 | Krzanowski | 715/767 |
| 7,394,452 | B2 * | 7/2008 | Wong et al. | 345/156 |
| 7,479,949 | B2 * | 1/2009 | Jobs et al. | 345/173 |
| 7,650,569 | B1 | 1/2010 | Allen et al. | |
| 7,663,607 | B2 | 2/2010 | Hotelling et al. | |
| D615,989 | S | 5/2010 | Chaudhri | |
| 7,800,592 | B2 | 9/2010 | Kerr et al. | |
| 7,934,168 | B2 * | 4/2011 | Sakamoto et al. | 715/822 |
| 8,001,479 | B2 | 8/2011 | Katsuranis et al. | |
| 8,001,488 | B1 | 8/2011 | Lam | |
| 2002/0033848 | A1 | 3/2002 | Sciammarella et al. | |
| 2002/0089536 | A1 | 7/2002 | Dang | |
| 2002/0109735 | A1 | 8/2002 | Chang et al. | |
| 2002/0191013 | A1 | 12/2002 | Abrams | |
| 2003/0148799 | A1 | 8/2003 | Chen | |
| 2004/0100479 | A1 | 5/2004 | Nakano et al. | |
| 2004/0189720 | A1 * | 9/2004 | Wilson et al. | 345/863 |
| 2005/0003851 | A1 | 1/2005 | Chrysochoos et al. | |
| 2005/0021336 | A1 | 1/2005 | Katsuranis | |
| 2005/0024322 | A1 | 2/2005 | Kupka | |
| 2005/0057524 | A1 | 3/2005 | Hill et al. | |
| 2005/0078093 | A1 | 4/2005 | Peterson et al. | |
| 2005/0088416 | A1 | 4/2005 | Hollingsworth | |
| 2005/0102638 | A1 * | 5/2005 | Jiang et al. | 715/855 |
| 2005/0149879 | A1 | 7/2005 | Jobs et al. | |
| 2005/0190280 | A1 * | 9/2005 | Haas et al. | 348/333.05 |
| 2005/0192924 | A1 * | 9/2005 | Drucker et al. | 707/1 |
| 2005/0243053 | A1 | 11/2005 | Liess et al. | |
| 2006/0007181 | A1 | 1/2006 | Jung et al. | |
| 2006/0010395 | A1 * | 1/2006 | Aaltonen | 715/779 |
| 2006/0015878 | A1 | 1/2006 | Ritter | |
| 2006/0053387 | A1 | 3/2006 | Ording | |
| 2006/0075348 | A1 | 4/2006 | Xu et al. | |
| 2006/0085757 | A1 | 4/2006 | Andre et al. | |
| 2006/0097991 | A1 | 5/2006 | Hotelling et al. | |
| 2006/0125962 | A1 | 6/2006 | Shelton et al. | |
| 2006/0181548 | A1 | 8/2006 | Hafey et al. | |
| 2006/0197750 | A1 | 9/2006 | Kerr et al. | |
| 2006/0197753 | A1 | 9/2006 | Hotelling | |
| 2006/0218504 | A1 | 9/2006 | Hiroi et al. | |
| 2006/0224989 | A1 | 10/2006 | Pettiross et al. | |
| 2006/0267951 | A1 | 11/2006 | Rainisto | |
| 2007/0101292 | A1 | 5/2007 | Kupka | |
| 2007/0101297 | A1 * | 5/2007 | Forstall et al. | 715/841 |
| 2007/0152984 | A1 | 7/2007 | Ording et al. | |
| 2007/0165004 | A1 | 7/2007 | Seelhammer et al. | |
| 2007/0177803 | A1 | 8/2007 | Elias et al. | |
| 2007/0220440 | A1 | 9/2007 | Song et al. | |
| 2007/0226647 | A1 | 9/2007 | Louch | |
| 2007/0245263 | A1 * | 10/2007 | Hale et al. | 715/810 |
| 2007/0273668 | A1 | 11/2007 | Park et al. | |
| 2007/0277124 | A1 | 11/2007 | Shin et al. | |
| 2007/0288860 | A1 * | 12/2007 | Ording et al. | 715/779 |
| 2007/0296709 | A1 | 12/2007 | GuangHai | |
| 2008/0001924 | A1 | 1/2008 | de los Reyes et al. | |
| 2008/0034317 | A1 | 2/2008 | Fard et al. | |
| 2008/0055265 | A1 | 3/2008 | Bewley et al. | |
| 2008/0062139 | A1 | 3/2008 | Hotelling et al. | |
| 2008/0062140 | A1 | 3/2008 | Hotelling et al. | |
| 2008/0062147 | A1 | 3/2008 | Hotelling et al. | |
| 2008/0062148 | A1 | 3/2008 | Hotelling et al. | |
| 2008/0064499 | A1 * | 3/2008 | Grant et al. | 463/36 |
| 2008/0082930 | A1 | 4/2008 | Omernick et al. | |
| 2008/0084400 | A1 | 4/2008 | Rosenberg | |
| 2008/0100593 | A1 * | 5/2008 | Skillman et al. | 345/175 |
| 2008/0104544 | A1 | 5/2008 | Collins et al. | |
| 2008/0148149 | A1 | 6/2008 | Singh et al. | |
| 2008/0168401 | A1 * | 7/2008 | Boule et al. | 715/863 |
| 2008/0281689 | A1 | 11/2008 | Blinnikka et al. | |
| 2008/0297484 | A1 | 12/2008 | Park et al. | |
| 2008/0303794 | A1 | 12/2008 | Bolt et al. | |
| 2008/0307335 | A1 * | 12/2008 | Chaudhri et al. | 715/764 |
| 2008/0316183 | A1 | 12/2008 | Westerman et al. | |
| 2009/0019031 | A1 | 1/2009 | Krovitz et al. | |
| 2009/0070691 | A1 | 3/2009 | Jain | |
| 2009/0164928 | A1 * | 6/2009 | Brown et al. | 715/767 |
| 2009/0183120 | A1 | 7/2009 | Ording et al. | |
| 2009/0193364 | A1 * | 7/2009 | Jarrett et al. | 715/838 |
| 2009/0199241 | A1 | 8/2009 | Unger et al. | |
| 2010/0081475 | A1 | 4/2010 | Chiang et al. | |
| 2010/0122290 | A1 | 5/2010 | Allen et al. | |
| 2010/0156656 | A1 | 6/2010 | Duarte et al. | |
| 2010/0156813 | A1 | 6/2010 | Duarte et al. | |
| 2010/0169766 | A1 | 7/2010 | Duarte et al. | |
| 2010/0211872 | A1 * | 8/2010 | Rolston et al. | 715/702 |
| 2010/0214278 | A1 | 8/2010 | Miura | |
| 2010/0295801 | A1 | 11/2010 | Bestle et al. | |

FOREIGN PATENT DOCUMENTS

| | | |
|---|---|---|
| CN | 101167045 A | 4/2008 |
| EP | 0 548 646 A1 | 6/1993 |
| EP | 1 462 921 A2 | 9/2004 |
| EP | 1 688 830 A1 | 8/2006 |
| GB | 2480777 A | 11/2011 |
| WO | WO-2008/030976 A2 | 3/2008 |
| WO | WO-2010/096219 A2 | 8/2010 |

OTHER PUBLICATIONS iPhone User's Guide, Chapter 5, pp. 58-59, Apple Safari Browser, "Opening Multiple Webpages at Once," (2007).

International Search Report mailed Oct. 30, 2009, issued in international application No. PCT/US2009/044389.

International Preliminary Report on Patentability issued on Nov. 30, 2010, in international application No. PCT/US2009/044389.

International Search Report mailed Oct. 30, 2009, issued in international application No. PCT/US2009/044390.

International Preliminary Report on Patentability issued on Nov. 23, 2010, in international application No. PCT/US2009/044390.

Office Action mailed Jan. 18, 2012, issued in related U.S. Appl. No. 12/126,145, filed May 23, 2008.

Examination Report, Application No. GB1219130.0, Date of Mailing: Nov. 26, 2012, pp. 1-8.

Examination Report, Application No. GB1219131.8, Date of Mailing: Nov. 26, 2012, pp. 1-8.

Extended European Search Report, European Application No. 09751303.0, Date: Apr. 2, 2012, pp. 1-6.

Extended European Search Report, European Application No. 09751304.8, Date: Apr. 3, 2012, pp. 1-6.

GB Examination Report, Patent Application No. GB1021630.7, Date: Jan. 24, 2012, pp. 1-5.

GB Examination Report, Patent Application No. GB1021636.4, Date: Mar. 20, 2012, pp. 1-3.

International Search Report mailed Jan. 25, 2011, issued in International Application No. PCT/US2010/038037.

International Search Report and Written Opinion mailed Dec. 17, 2007, issued in International Application No. PCT/2009/042735.

(56) References Cited

OTHER PUBLICATIONS

"Designing for the Multitasker," Internet Article, Publication Date: Mar. 17, 2010; <http://blog.graphicpeel.com/post/454779602/designing-for-the-multitasker>.

Chinese Office Action, Chinese Patent Application No. 200980118088.4, Date: Sep. 24, 2012, pp. 1-5.

Office Action, Chinese Application No. 20090126335.5, Oct. 8, 2012, pp. 1-8.

International Preliminary Report on Patentability, International Application No. PCT/US2010/038037, Date of Mailing: Feb. 2, 2012, pp. 1-6.

International Preliminary Report on Patentability of the International Bureau of WIPO, PCT/US2007/066889, Dec. 31, 2008, 5 pages.

International Search Report and Written Opinion of the International Searching Authority in International Application PCT/US2007/066889, ISA US Commissioner for Patents, Nov. 24, 2008, 9 pages.

* cited by examiner

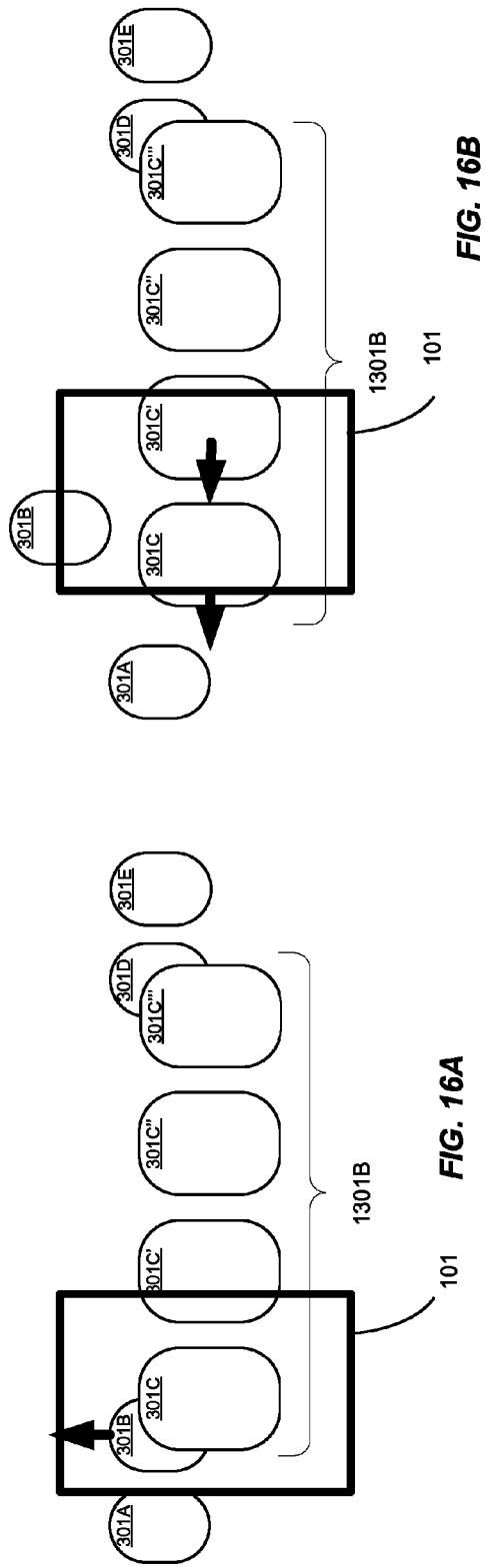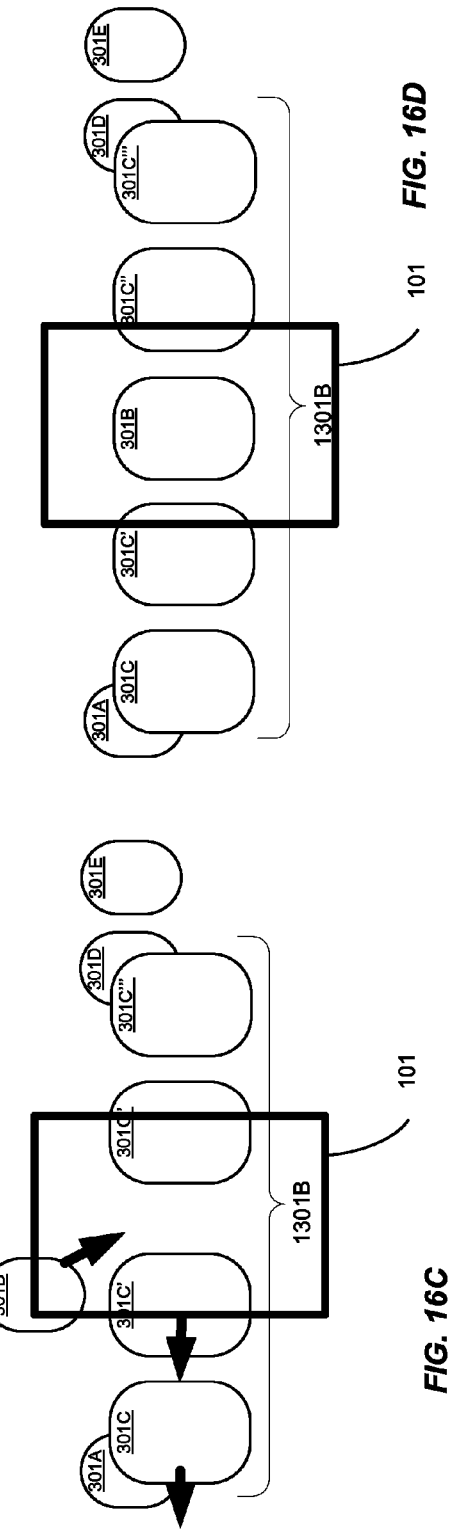

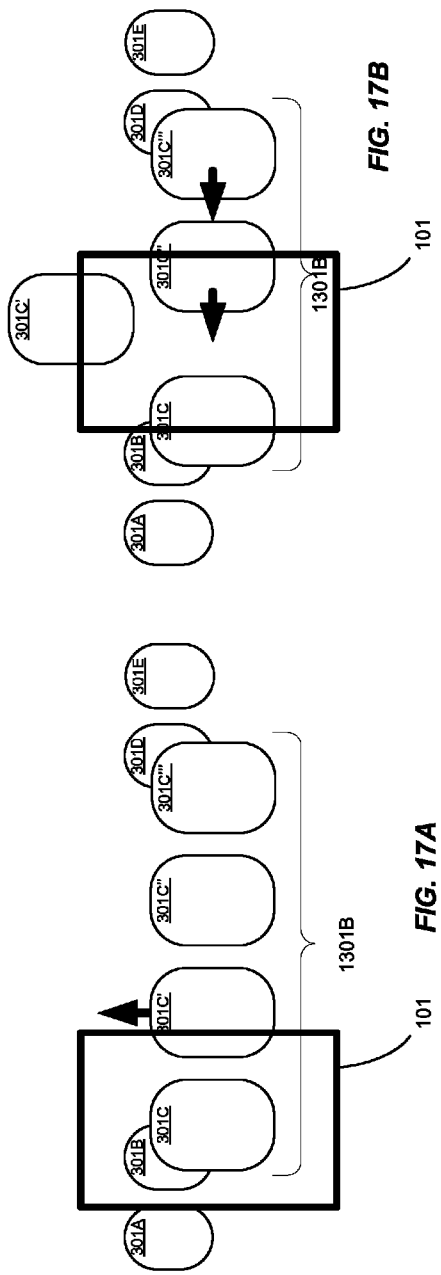
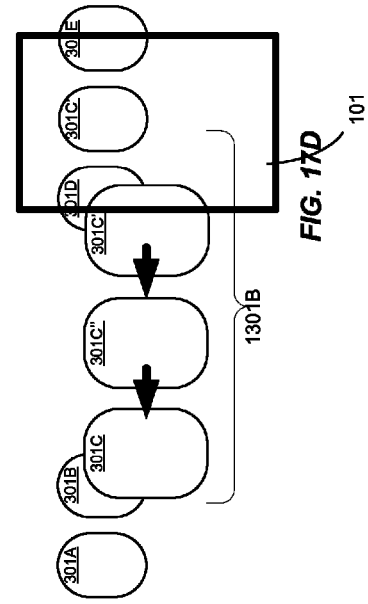
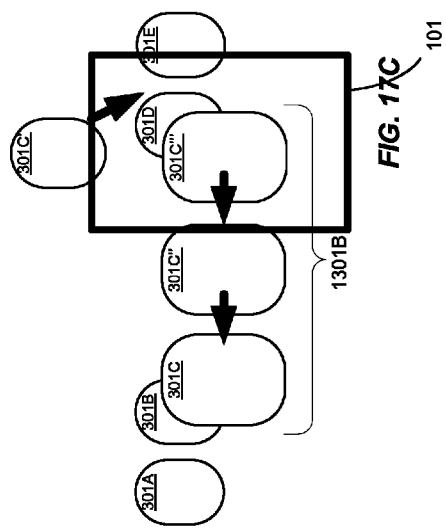
FIG. 17A
FIG. 17B
FIG. 17C
FIG. 17D ically, for example, when attempting to reach a particular person via the user's phone, text messaging and e-mail application, along with a web browser for looking up information.

CARD METAPHOR FOR ACTIVITIES IN A COMPUTING DEVICE

CROSS-REFERENCE TO RELATED APPLICATIONS

The present application claims priority as a continuation-in-part of U.S. patent application Ser. No. 12/126,145, filed May 23, 2008, for "Navigating Among Activities in a Computing Device", the disclosure of which is incorporated herein by reference.

The present application is related to U.S. patent application Ser. No. 12/115,992, filed May 6, 2008, for "Extended Touch-Sensitive Control Area for Electronic Device", the disclosure of which is incorporated herein by reference.

The present application is related to U.S. patent application Ser. No. 11/379,552, filed Apr. 20, 2006, for "Keypad and Sensor Combination to Provide Detection Region that Overlays Keys", the disclosure of which is incorporated herein by reference.

FIELD OF THE INVENTION

In various embodiments, the present invention relates to application management in computing devices, and more particularly to systems and methods for implementing a card metaphor for activities such as software applications in such devices.

DESCRIPTION OF THE RELATED ART

Many currently available computing devices run operating systems that offer users the opportunity to run several applications at the same time, and even to perform several activities simultaneously, within a single application and/or among two or more applications. For example, a user may open an e-mail application, a word processing application, an on-screen calculator, and a web browser, so that all of the applications are open concurrently. The user may open several documents within the word processing application, and may open several e-mail messages. Such an arrangement allows the user to move from one task to another by keeping these various applications and activities open at the same time.

Conventionally, such an operating paradigm is accomplished by the use of multiple overlapping windows within a graphical user interface. A desk-top metaphor is often employed, wherein the user can move and resize windows on a display screen by direct manipulation. Thus, each application may have a window or several windows; at any given time, one window has focus (usually indicated as such by being situated on top of the other windows). Other windows may be visible, invisible, or partially visible (for example if they are partially or completely obscured by other windows). A user can switch from one task to another by causing a different window to have focus; this is commonly accomplished by clicking on a visible portion of the window being activated, or by clicking on a button or icon representing the window or application in a task bar, quick-launch area, or similar construct. In some operating systems, pop-up menus and/or keyboard shortcuts may be available for switching among applications or documents.

Overlapping windows are a highly effective mechanism for application management. They exploit the user's spatial memory by associating a particular area of the screen with a particular task being performed. A user may find it easier to return to a previously opened window when he or she remembers that the window was placed at a particular location on the screen, as compared with a list or menu of open windows that does not provide a model of spatial placement and stability.

One issue with conventional window-based mechanisms for application management is that a large screen size is usually needed. Users faced with limited screen space must choose between, on the one hand, making windows smaller and thus reducing available workspace within each application, and, on the other hand, stacking windows atop each other so that only one window (or very few) is visible at a time. Reducing workspace can make it very difficult to use an application, particularly for applications such as word processing, photo editing, drawing, and the like. Stacking windows reduces the ease with which the user can switch from one application or document to another, as it is more difficult to see what is currently open and to find the appropriate window to be activated. When windows are stacked, users usually resort to navigation via taskbar, quick-launch area, menu, keyboard shortcut, or the like, thereby reducing the advantages of the overlapping window paradigm.

Some systems, such as the Mac OS operating system offered by Apple, Inc. of Cupertino, Calif., offer a mechanism for navigating among open applications by temporarily moving and shrinking open windows, moving the windows apart from one another so that they do not overlap. The user can then activate one of the windows; the original window positions and sizes are then restored, with the activated window on top. This feature is effective in allowing users to quickly switch among open applications and documents, but still requires a relatively large amount of screen space so as to effectively show the temporarily shrunk windows when the user is to select among them.

Mobile devices such as smartphones, personal digital assistants, music players, handheld computers, and the like are becoming increasingly powerful. Many are now able to run several applications concurrently, and to perform sophisticated functions that rival traditional computing devices. However, most such devices have extremely small screens, when compared to laptop or desktop computers. Thus, the conventional window-based techniques for navigating among open applications and documents do not function very well on mobile devices. There is insufficient screen space to display multiple overlapping windows. In fact, many such devices do not even have enough space to display a task bar or quick-launch area. Rather, the entire screen is often devoted to a single application, document, message, task, or activity, so as to make the most effective use of the extremely limited amount of space available.

SUMMARY

Related U.S. patent application Ser. No. 12/126,145, filed May 23, 2008, for "Navigating Among Activities in a Computing Device", the disclosure of which is incorporated herein, describes various embodiments for running two or more activities concurrently on a computing device, and provides at least two modes for interacting with the activities. The user may toggle between the modes as desired. A button or other control is provided for switching between full-screen mode and card mode.

In various embodiments, a card metaphor is established, in which each activity can be represented within an area of the screen. For purposes of the description herein, these areas of the screen are referred to as "cards". Although in some ways cards resemble windows as are known in the art of desktop user interfaces, in various embodiments cards can be manipulated in particular ways that are not generally available to conventional window-based graphical user interfaces; such manipulations are described in more detail herein. One skilled in the art will recognize that the term "card" is used herein merely as a convenient term for referring to an area of the screen that contains information related to or generated by an activity such as a software application.

In various embodiments, any of several display modes are available for viewing, interacting with, manipulating, initiating, and dismissing cards.

In one embodiment, in a full-screen mode, one activity occupies substantially an entire display screen. The card thus fills substantially the entire display screen, although in some embodiments some areas of the screen may be reserved for status indicators, alerts, messages, and the like.

In one embodiment, a second mode is available, referred to as "card mode". In card mode, one activity is visible within a card, and a portion of at least one other card is also visible. Thus, a card that has focus (i.e., that the user is interacting with) is visible in full, while at least one other card is only partially visible. In the card mode, the user can cause cards to move on the screen, so as to change focus from one card to another. For example, the card having focus can be moved off the screen, to be replaced by a new card that is then given focus. In one aspect, the cards are ordered in a sequence. In one aspect, the cards move in concert with one another; pushing one card off one edge of the screen causes a new card to appear at the opposite edge. A persistent positional relationship can be established among cards, based on the established sequence (although the user can rearrange the sequence if desired).

In one embodiment, a third mode is available, referred to as "shuffle mode". In shuffle mode, two or more cards are shown in full. The size of the cards may be reduced so that more cards can be shown simultaneously. In addition, portions of one or more other cards may be visible. For example, in one embodiment, three cards can be shown in full in a horizontal row, with portions of two other cards shown to the left and right of the fully displayed cards. In one embodiment, shuffle mode facilitates easier reordering and manipulation of cards, and is associated with certain behaviors (described below) to optimize such operations. In one embodiment, shuffle mode resembles a zoomed out view of the cards presented in card view. In one embodiment, the user can zoom out to various degrees, so that several different varieties of shuffle mode can be presented, for example with different numbers of cards on the screen. In one embodiment, when more cards are displayed, they are displayed at a smaller size. In one embodiment, cards are presented in a linear arrangement in shuffle mode, preserving the linear sequence used in card mode.

In one embodiment, a fourth mode is available, referred to as "grid mode". In grid mode, a larger number of cards are shown in full. In one embodiment, cards are scaled down in size so that all available cards are displayed simultaneously. In another embodiment, all cards are displayed to a predetermined maximum number of cards; if more than the predetermined maximum are available for display, scrolling is implemented to allow access to non-displayed cards. In one embodiment, cards are presented in a grid arrangement in grid mode.

In one embodiment, a user can manipulate cards in different ways depending on which mode is currently active. In one embodiment, different interactions are available in different modes, and/or certain user actions can be interpreted differently depending on which mode is currently active. The particularities of such differences are described below for various embodiments of the invention.

In one embodiment, cards are active, regardless of the current display mode, so that the information represented in a card is substantially current and is updated substantially in real-time. In one embodiment, the user can interact with cards regardless of display mode, so that user interface elements within cards are active regardless of the display mode. In another embodiment, in some display modes, some or all cards may not be active, so that the data shown therein can be "frozen" while in a particular mode; such an embodiment may be useful, for example, when available system resources preclude real-time updating of all cards without undesirably degrading system performance. Similarly, "frozen" cards may be temporarily inhibited from accepting user input in some embodiments.

In one embodiment, a persistent positional relationship is established and maintained among cards. The positional relationship can be a one-dimensional sequence or some more complex two-dimensional relationship. The positional relationship is persistent in the sense that it does not change unless the user indicates that it should be changed, or some other event takes place that indicates a change is warranted (such as non-use of an application, or an application crashing or being dismissed).

In one embodiment, cards are initially positioned according to the order in which the corresponding activities (such as applications) were launched. New cards can be launched, for example, when a new application or activity is launched, or in some cases for an application that is already running (for example if a new message is being composed in an email application). Thus, in an embodiment where a one-dimensional sequence of cards is implemented, a newly-activated card would be placed at the end of the sequence; for example, if a horizontal row is used, the newly-activated card could be placed to the right of the right-most card in the sequence. A user can, of course, reposition cards as desired.

In one embodiment, if a user launches a new activity (such as an application), a card (or more than one card) for the activity is created, with a position at the end of the sequence. If the user attempts to launch an activity that is already running, in one embodiment the card is not moved within the sequence of cards, but the current view of the sequence is shifted so that the card for the activity is given focus and presented in a central location on the screen. Alternatively, in another embodiment, if the user attempts to launch an activity that is already running, the card for that activity is moved to the end of the sequence.

As described above, in one embodiment, newly opened cards are initially positioned at the end of the sequence. In another embodiment, some newly opened cards may be placed at locations other than at the end of the sequence. For example, any new cards for an already-running activity are placed adjacent to previously existing card(s) for that application. These cards, referred to as "sibling cards", are therefore positioned so that cards for a given activity are located adjacent to one another in the overall card sequence. For example, a new card for an email application may appear when a user initiates a reply to an email message; the new sibling card for the reply can be positioned adjacent to the existing card for the original message.

In one embodiment, the user is free to move sibling cards so that they are no longer adjacent to one another; in another embodiment, sibling cards cannot be separated from one another, although they can be moved as a group.

In one embodiment, a visual paradigm can be employed to indicate groups of cards. For example, in one embodiment, card groups can be denoted by stacks; all cards within a particular group are displayed in a manner that resembles a stack of cards. Alternatively, card groups can be indicated in other ways that distinguish them from non-grouped cards: for example, card groups can be shown via a distinctive color scheme, different sizes, different vertical or horizontal positioning, bracketing, highlighting, spacing, or any other mechanism. In various embodiments as described below, a user can interact with groups, separating their constituent cards as desired, creating new groups, changing the order of groups, and the like. In one embodiment, where stacking is used to indicate groups, cards can be "unstacked" at times, even while preserving their group relationship, either automatically or manually to facilitate certain types of interactions and viewing of constituent cards. While cards are unstacked, in some embodiments, an alternative mechanism, such as bracketing or distinctive coloring, is used to remind the user that the cards are still members of a group.

The various features described above and herein can be implemented singly or in any combination, as will be apparent to one skilled in the art. Additional features and advantages will become apparent in the description provided below.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

FIGS. 16A through 16D depict a sequence for adding a card to a group according to one embodiment of the present invention.

FIGS. 17A through 17D depict a sequence for removing a card from a group according to one embodiment of the present invention.

DETAILED DESCRIPTION OF THE EMBODIMENTS

In the following description, reference is made herein to "activities". In the context of the present invention, an "activity" is intended to include a software application, a task, a document, a page, and/or any other activity that can be performed in connection with an electronic device. As described herein, the present invention provides techniques for displaying and manipulating representations of activities on an electronic device, using a card metaphor. Thus, activities are represented by "cards", which is a term used herein to refer to areas of the screen that can be moved and manipulated by the user. Users interact with cards to launch, terminate, and reorder activities, as well as to navigate among activities and perform other operations, as described in more detail below.

System Architecture

In various embodiments, the present invention can be implemented on any electronic device, such as a handheld computer, personal digital assistant (PDA), personal computer, kiosk, cellular telephone, and the like. For example, the invention can be implemented as a feature of an application management paradigm for a software application or operating system running on such a device. Accordingly, the present invention can be implemented as part of a graphical user interface for controlling software on such a device.

In various embodiments, the invention is particularly well-suited to devices such as smartphones, handheld computers, and PDAs, which have limited screen space and which are capable of running several software applications concurrently. One skilled in the art will recognize, however, that the invention can be practiced in many other contexts, including any environment in which it is useful to switch easily and smoothly from one activity to another. Accordingly, the following description is intended to illustrate the invention by way of example, rather than to limit the scope of the claimed invention.

Figure 1:
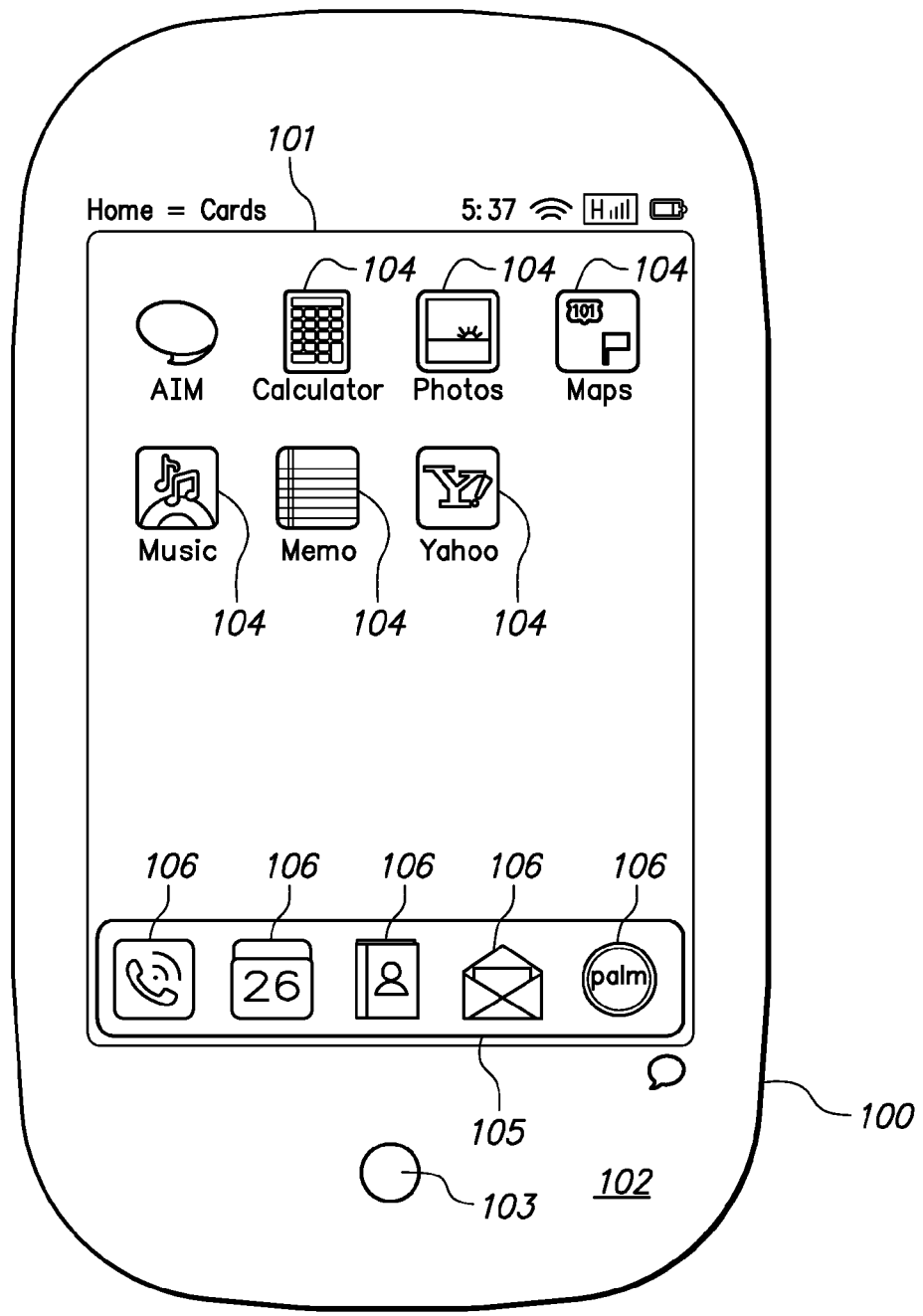
FIG. 1 depicts a display screen showing a launcher for initiating an activity such as an application.

Referring now to FIG. 1, there is shown an example of an example of a device 100 including a display screen 101 showing a launcher including several icons 104 representing applications that can be opened by the user, according to one embodiment. A quick-launch area 105 is also shown, including additional icons 106 for launching commonly used applications and other functions. Quick-launch area 105 is not necessary for the present invention, but is shown for illustrative purposes only.

In one embodiment, screen 101 is touch-sensitive, so that a user can activate an application or function by touching a displayed icon 104, 106. In one embodiment, device 100 also includes a touch-sensitive gesture area 102 for entering gesture-based commands, as described in the above-referenced related application. In another embodiment, screen 101 and/or gesture area 102 is sensitive to user motion in proximity to the surface, so as to detect gestures and commands performed near the surface but without necessarily contacting the surface.

For illustrative purposes, device 100 as shown in FIG. 1 is a personal digital assistant or smartphone. Such devices commonly have telephone, email, and text messaging capability, and may perform other functions including, for example, playing music and/or video, surfing the web, running productivity applications, and the like. The present invention can be implemented, according to various embodiments, in any type of device having a touch-sensitive screen, and is not limited to devices having the listed functionality. In addition, the particular layout shown in FIG. 1 is merely exemplary and is not intended to be restrictive of the scope of the claimed invention.

In various embodiments, touch-sensitive screen 101 and gesture area 102 can be implemented using any technology that is capable of detecting a location of contact and/or user motion proximate to the surface. Alternatively, the present invention can be implemented with other user input mechanisms, such as a keyboard, trackball, stylus, or the like. One skilled in the art will recognize that the techniques of the present invention are well suited to direct manipulation, but that any input technique can be used. In one embodiment, gesture area 102 provides a touch-sensitive control area extending beyond the edges of touch-sensitive screen 101, as described in related application Ser. No. 12/115,992, filed May 6, 2008, for "Extended Touch-Sensitive Control Area for Electronic Device", the disclosure of which is incorporated herein by reference.

In one embodiment, device 100 as shown in FIG. 1 also has a physical button 103. In one embodiment, physical button 103 can be used to toggle between full-screen mode and card mode, as described in more detail below. Physical button 103 is not needed for the present invention, and is shown for illustrative purposes only.

Card Metaphor

As described herein, in one embodiment two or more modes are available for interacting with device 100. A determination is made as to which display mode is currently active on device 100. Depending on the current display mode, cards 301 are displayed differently. In various embodiments, display modes can include any combination of the following:

a "full-screen" mode, in which a card representing an application or other activity occupies substantially the entire display screen 101;

a "card" mode, in which at least two cards are presented, at least one of which is only partially visible, with each card representing an application or other activity;

a "shuffle" mode, in which cards are presented at a reduced size with respect to card mode, so that more than one card can be presented in full; and a "grid" mode, in which card size is reduced according to available screen space.

As described in more detail below, device 100 can receive input from the user. In various embodiments, such input can cause device 100 to switch from one display mode to another, and/or to reposition displayed cards in response to user input specifying a switch to another card.

One skilled in the art will recognize that the names given to the modes ("full-screen", "card", "shuffle", and "grid") are used herein solely for identification purposes, and are not intended to connote any particular characteristic of the modes or restrict the scope of the invention in any other way. In general, and without limiting the scope of the claimed invention: full-screen mode is optimized for maximum use of screen space for interacting with a single activity; card mode is optimized for easily switching focus from one activity to another and for easily initiating and terminating activities; shuffle mode is optimized for reordering and manipulating cards representing activities; and grid mode is optimized to provide an overview of open activities. Many actions can be taken in more than one mode. In one embodiment, activities are live and able to accept input and display output regardless of the current mode; in another embodiment, activities may be live in some modes but not in others. The various modes will be described in more detail below.

Full-Screen Mode

Figure 2:
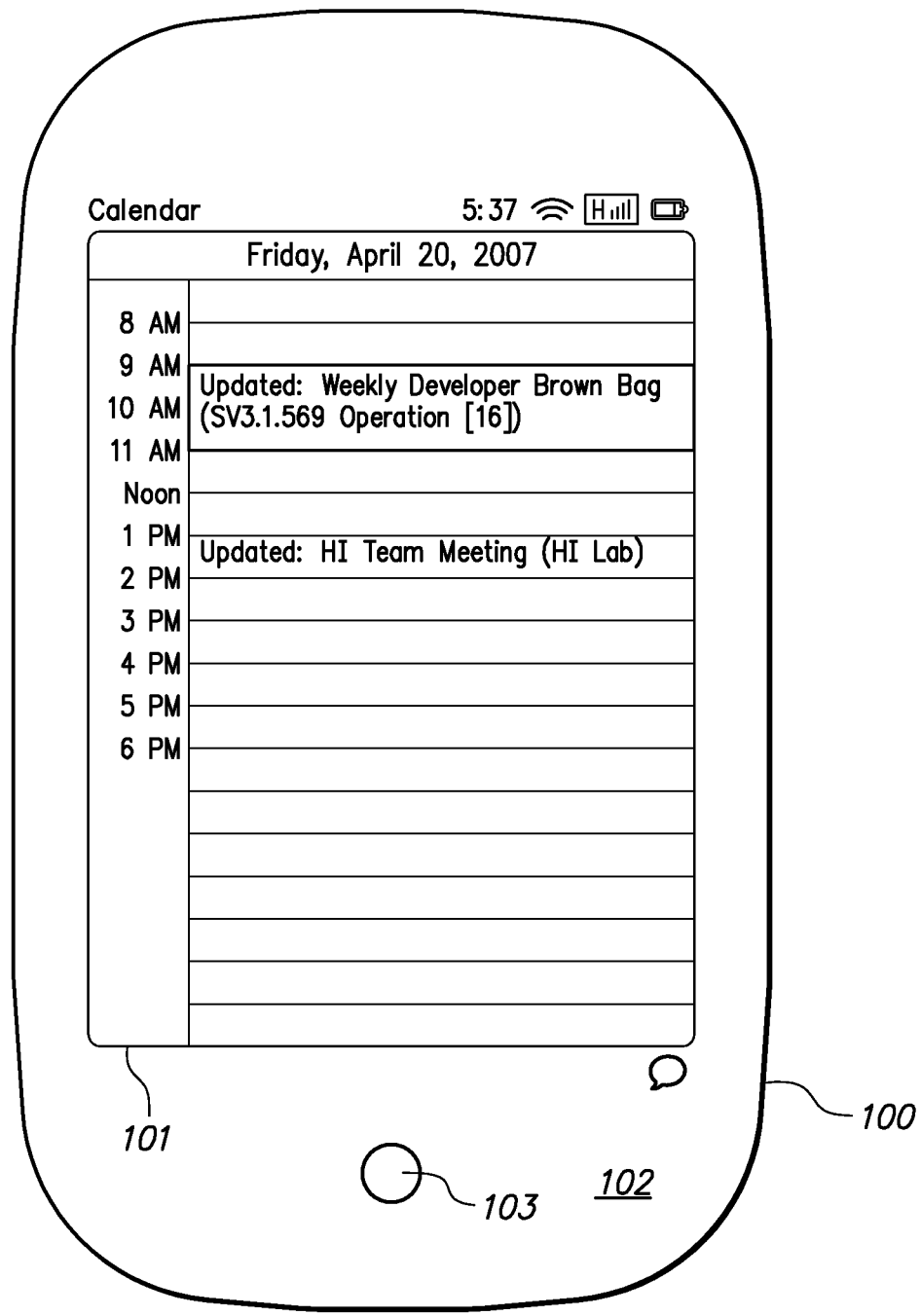
FIG. 2 depicts the display screen in full-screen mode, wherein an activity occupies substantially the entire display screen, according to one embodiment of the present invention.

Referring now to FIG. 2, there is shown display screen 101 in full-screen mode according to one embodiment. In the example, a calendar application occupies substantially the entire display screen 101; however, one skilled in the art will recognize that any activity can be presented in this manner. As shown in FIG. 2, even in full-screen mode, certain portions of display screen 101 may be reserved for a title bar, battery indicator, clock, signal strength indicator, and the like. Accordingly, the term "full-screen mode" as used herein is intended to refer to any arrangement wherein the primary focus of the screen 101 is a single activity, even if other, smaller areas of screen 101 are reserved for other functions.

The user interacts with the active activity (such as the calendar application shown in FIG. 2) by conventional user interface methods, including manipulating on-screen elements, entering text, and the like. Such techniques are well known in the art.

Card Mode

Figure 3:
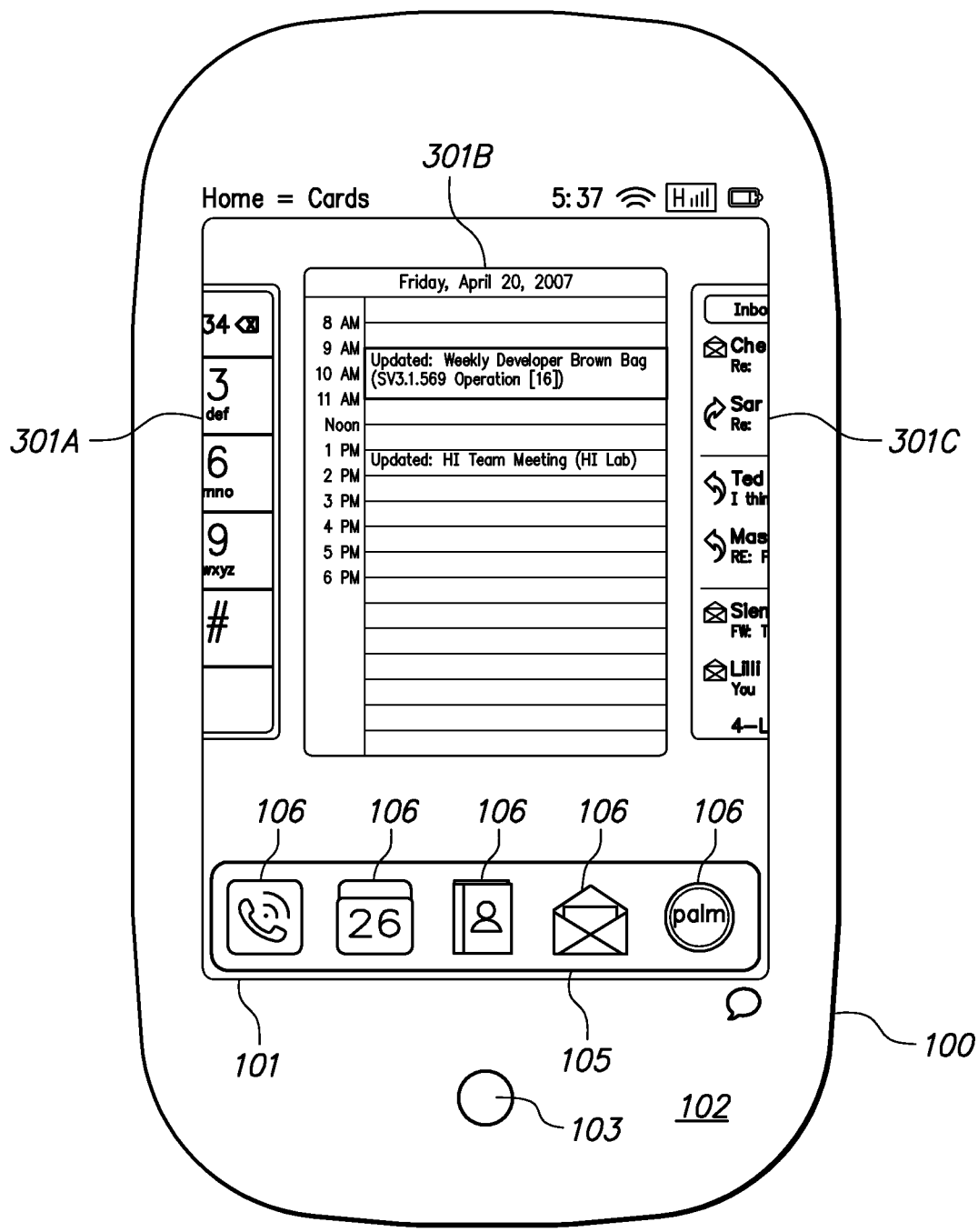
FIG. 3 depicts the display screen in card mode, including a card having focus and two partially displayed cards, according to one embodiment of the present invention.

Referring now to FIG. 3, there is shown an example of display screen 101 in card mode according to one embodiment. In one embodiment, the user can switch among modes pressing physical button 103. In another embodiment, the user can touch or double-tap a card 301 in card mode to initiate a switch to full-screen mode. In yet another embodiment, device 100 switches from card mode to full-screen mode after some period of inactivity. Other mechanisms can also be provided for switching among the modes.

As can be seen in FIG. 3, in one embodiment in card mode, card 301B having focus is fully visible. Other cards 301A, 301C are only partially visible and do not have focus. Usually, card 301B having focus represents the same activity that was displayed in full-screen mode immediately before the switch to card mode. Any number of partially displayed cards 301A, 301C can be presented. In the example of FIG. 3, two such cards 301A, 301C are shown, one on either side of card 301B having focus. Typically, in an arrangement where cards 301 are presented along a linear axis, one or two partially displayed card(s) 301 can be displayed adjacent to the card 301 that has focus. Also, as shown in FIG. 3, in one embodiment, partially displayed cards 301A, 301C are shown slightly smaller than card 301B having focus, so as to further emphasize the fact that card 301B has focus.

In one embodiment, partially displayed cards 301A, 301C provide a positional context for card 301B, and provide a mechanism for navigating to other activities. In one embodiment, the user can designate a card 301A, 301C to have focus by touching any area within the card; this causes the designated card 301 to move to the central portion of display screen 101, and causes other cards to move as well, so that the same positional sequence is maintained. In one embodiment, the user can designate a card 301A, 301C to have focus by dragging any displayed card 301 to cause the desired card 301 to move to the central portion of display screen 101; again, other cards 301 move as well, so that the same positional sequence is maintained. In one embodiment, the user can move cards 301 left and right by dragging a finger along gesture area 102. In one embodiment, such a gesture can be performed even in full-screen mode, causing cards 301 to move left and right in the same manner as described above for card mode.

In response to a user command, cards 301 shift position on screen 101, so that, for example card 301B that currently has focus becomes only partially visible and one of the other cards 301A, 301C becomes fully visible and has focus. The cards 301 move in concert with each other, in response to user commands. Thus, for example, if the user indicates that a central card 301 should move in a rightward direction, then the entire display shifts to the right, as follows:

The central card 301 (which has focus) moves to the right, so that it is only partially visible along the right hand side of display screen 101.

If any card 301 was partially visible to the right of the card 301 that has focus, it moves off the right edge of display screen 101 so that it is no longer visible.

If any card 301 was partially visible to the left of the card 301 that has focus, it moves to the right so that it is now fully visible and has focus.

In one embodiment, the user indicates such movement, for example, by direct manipulation of the displayed cards 301. This can be performed on a touch screen, for example, by dragging the central card 301 to the left or to the right on the screen or by tapping on a card that is partially displayed. Alternatively, a trackball, touch-sensitive pad, or other input device can be provided for facilitating such direct manipulation.

Accordingly, in one embodiment, when the user drags a card 301 to the left or right within display screen 100, other cards 301 move in concert with the dragged card 301. Thus, for example, if the user drags card 301B to the right, cards 301A and 301C move to the right as well. This would cause card 301C to move off the screen, and card 301A would move to the central position of display screen 100. The same result would occur if the user drags card 301A to the right.

In one embodiment, if the user drags cards 301 so as to place a card 301 sufficiently close to the central position to make it clear that the intention is to give the card 301 focus, the card 301 snaps into the central position upon completion of the drag operation. Other cards 301 snap into place accordingly to maintain the same positional sequence. Thus, the user need not drag the card 301 all the way to the central position. If, on the other hand, the user drags cards 301 a small amount that does not cause a new card 301 to be sufficiently close to the central position, all cards 301 snap back to their previous positions upon completion of the drag operation.

In one embodiment, cards 301 show applications or other activities in operation. Thus, as the user navigates among cards 301, he or she can see the actual live application or other activity within each card 301.

In various embodiments, card motion can be constrained to a single axis, for example horizontal or vertical but not both, so as to simplify the positional relationship among cards 301. Alternatively, two or more axes of movements can be made available. In the examples described herein, cards 301 are arranged in a horizontal row. The user moves cards 301 along a horizontal axis to navigate from one activity to another. One skilled in the art will recognize that other arrangements are possible. For example, cards 301 could be arranged vertically instead of horizontally. Alternatively, a two-dimensional arrangement of cards 301 can be provided.

In one embodiment, once the user has moved the desired card 301 to the central position so that it has focus, he or she can indicate that display screen 101 should return to full-screen mode, so that the card 301 having focus occupies substantially the entire display screen 101. Alternatively, device 100 can return to full-screen mode automatically after a period of time elapses where no card movement takes place, or if the user starts to interact with the activity that has focus. In one embodiment, the card 301 that currently has focus is always fully visible and displayed in a substantially central location on display screen 101 with respect to partially displayed cards 301.

Figure 4:
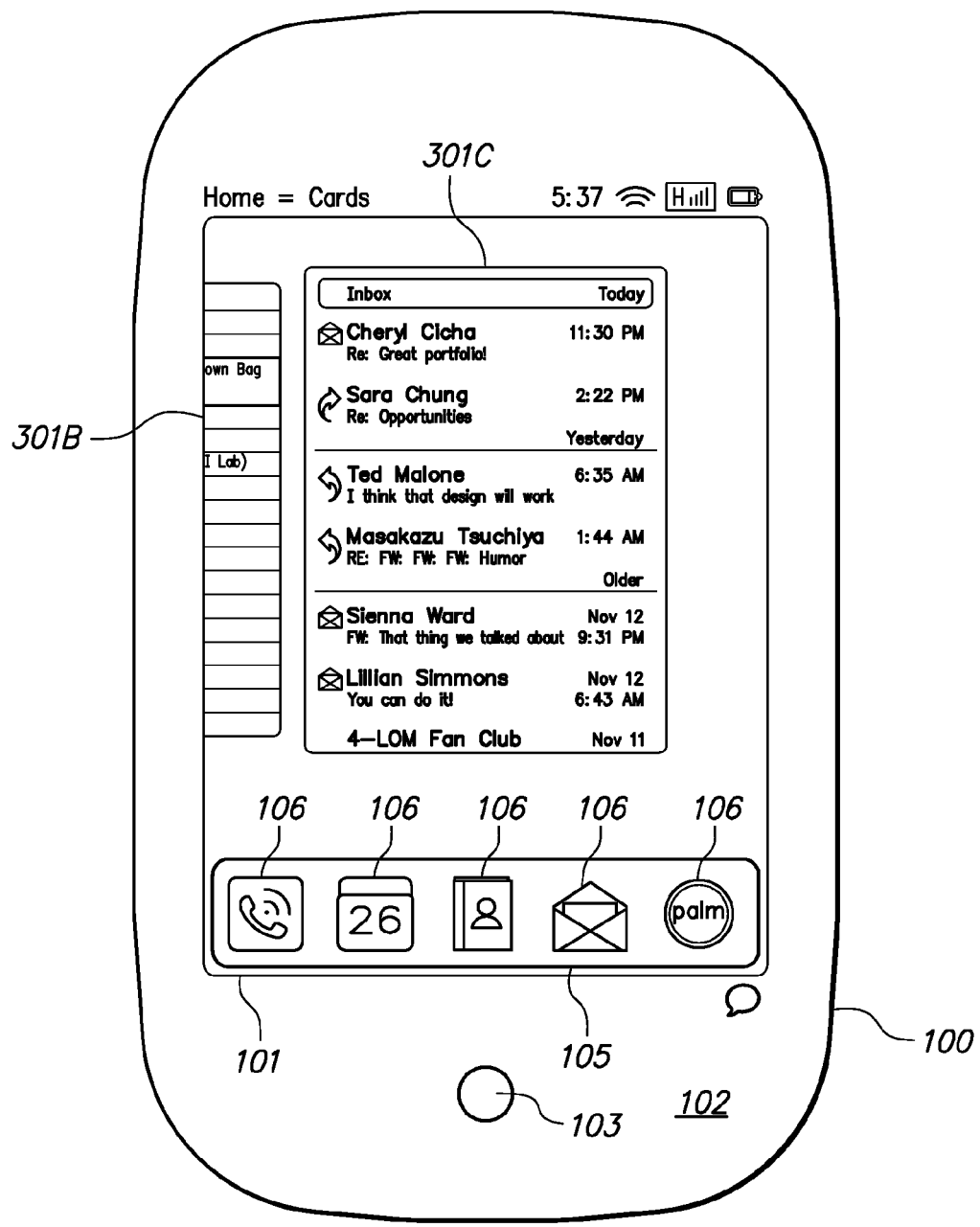
FIG. 4 depicts the display screen in card mode after the user has moved the cards, according to one embodiment of the present invention.

Referring now to FIG. 4, there is shown an example of display screen 101 in card mode, after the user has caused card 301C (representing an email application) to become centrally located and to have focus in one embodiment. As can be seen in FIG. 4, card 301B that previously had focus is now partially visible to the left of card 301C. Card 301A is no longer visible.

Figure 5:
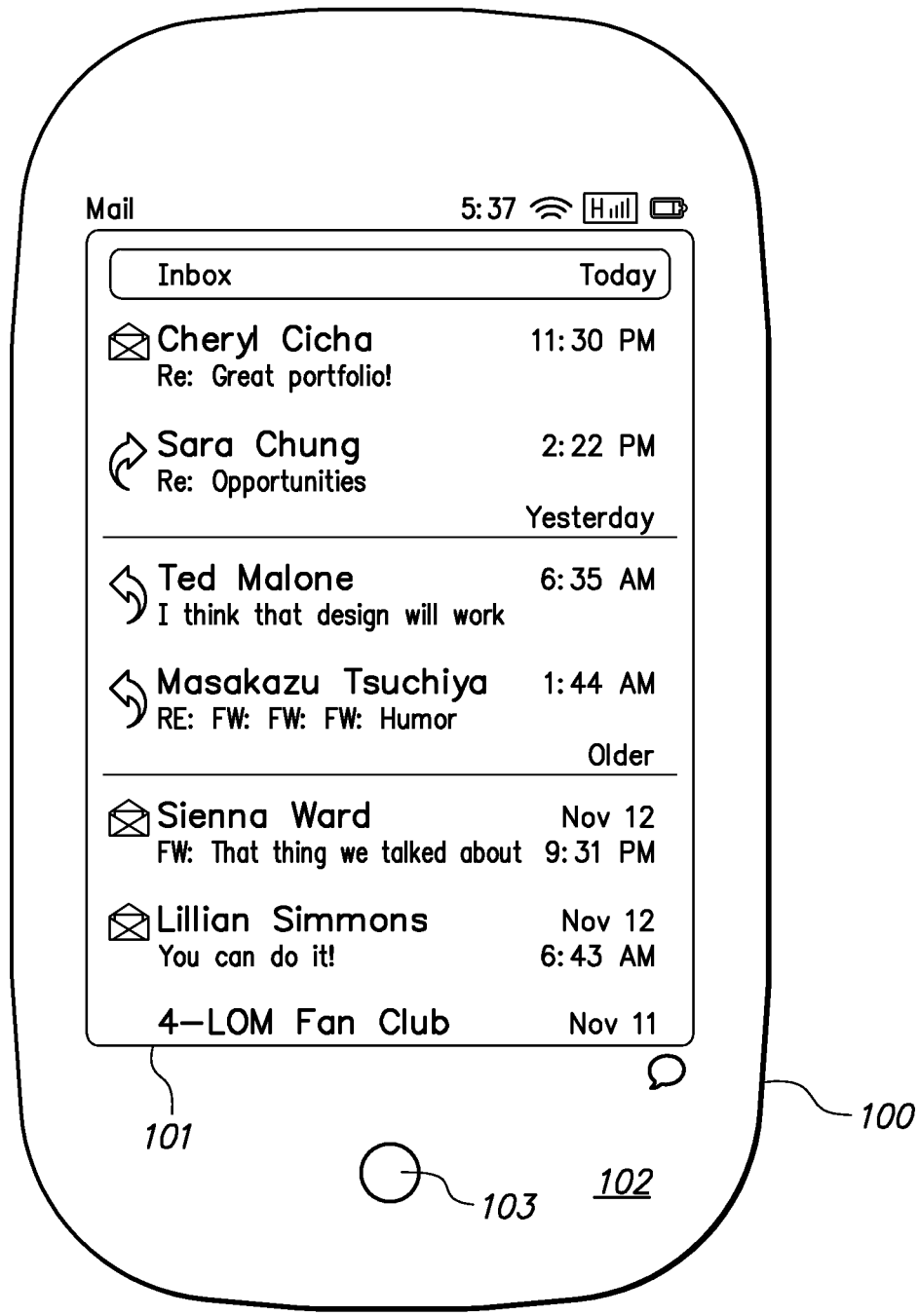
FIG. 5 depicts the display screen in full-screen mode after the user has designated a new card as having focus, according to one embodiment of the present invention.

In one embodiment, the user can touch or double-tap card 301C to re-enter full-screen mode with the new activity having focus and being active, as shown in FIG. 5. Alternatively, the user can press button 103 to toggle between full-screen mode and card mode. Thus, in FIG. 5 the user has completed the switch from the calendar application of FIG. 2 to the email application.

Figure 7:
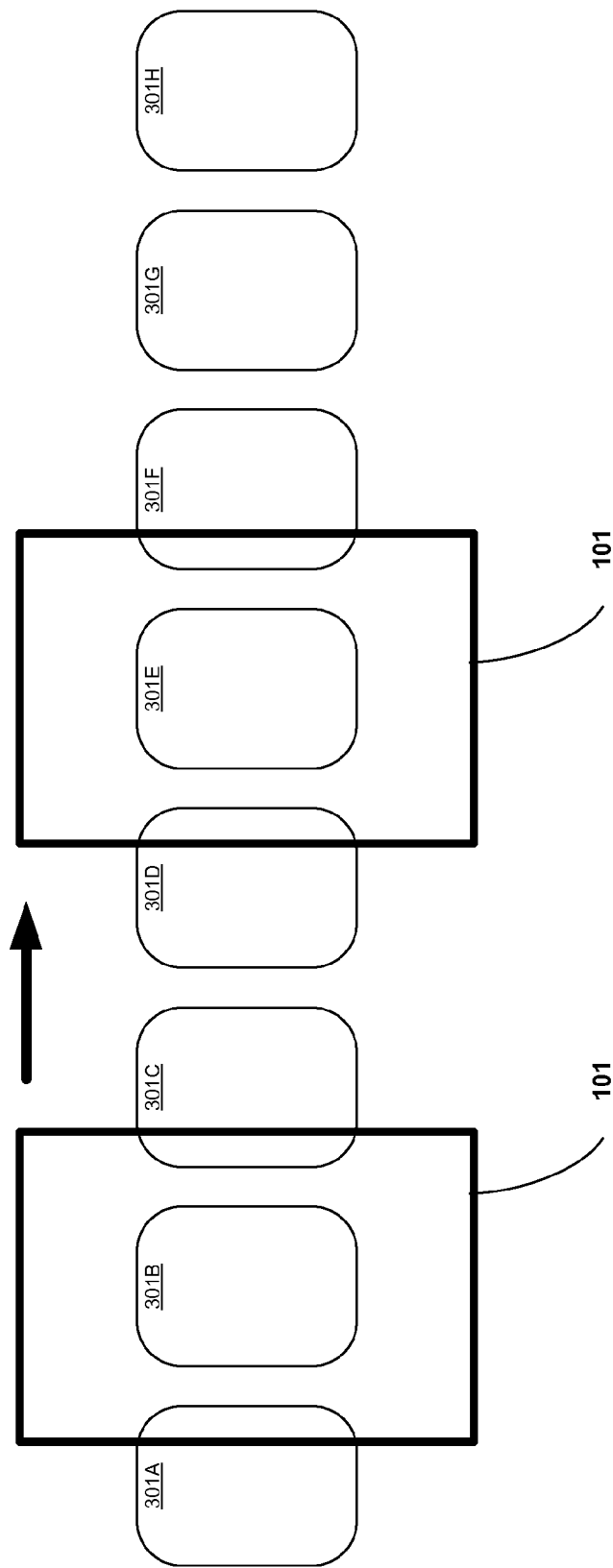
FIG. 7 is a conceptual depiction of a sequence for switching from one card to another according to one embodiment of the present invention.

Referring now to FIG. 7, there is shown a conceptual depiction of a sequence for switching from one activity to another according to one embodiment of the present invention. A number of activities are open, each represented by a card 301A through 301H. Screen 101 only shows a subset of the cards 301 at any given time. As can be seen in the Figure, a positional sequence is maintained even though most of the cards 301 are not visible at any given time. FIG. 7 depicts movement of the display screen 101 from an initial position where card 301B has focus (and cards 301A and 301C are partially visible) to a second position where card 301E is has focus (and cards 301D and 301F are partially visible).

The movement of display screen 101 is conceptual. In actual operation in one embodiment, the switch from card 301B to card 301E is accomplished by moving cards 301 in a leftward direction on screen 101. For example, the user can repeatedly drag cards 301 in a leftward direction to cause cards 301C, 301D, and 301E to successively occupy the central position. Alternatively, the user can click on partially displayed card 301C to move it to the central position and to cause card 301D to be partially displayed, then on partially displayed card 301D to move it to the central position and to cause card 301E to be partially displayed, and then on partially displayed card 301E to move it to the central position. Either mechanism operates to shift focus from the activity represented by card 301B to the activity represented by card 301E.

In one embodiment, a transition effect is performed to enhance the smoothness of the transition as cards 301 move and/or snap into place. In one embodiment, the card 301 that is centrally displayed at any given time is shown slightly larger than other cards 301.

In general, the sequence of cards 301 is persistent, even when the user moves from one card to another 301. In one embodiment, the sequence is circular, so that the rightmost card 301 is considered to be to the left of the leftmost card 301. Thus, moving off one end of the sequence takes the user back to the other end of the sequence. In another embodiment, as depicted in FIG. 4, the sequence is not circular, so that there is a first and last card 301 in the sequence.

In one embodiment, cards 301 may be moved within the sequence automatically in some circumstances. For example, frequently used cards 301 can be moved to more prominent locations in the sequence, while less frequently used cards 301 can remain in less prominent locations.

Figure 6A:
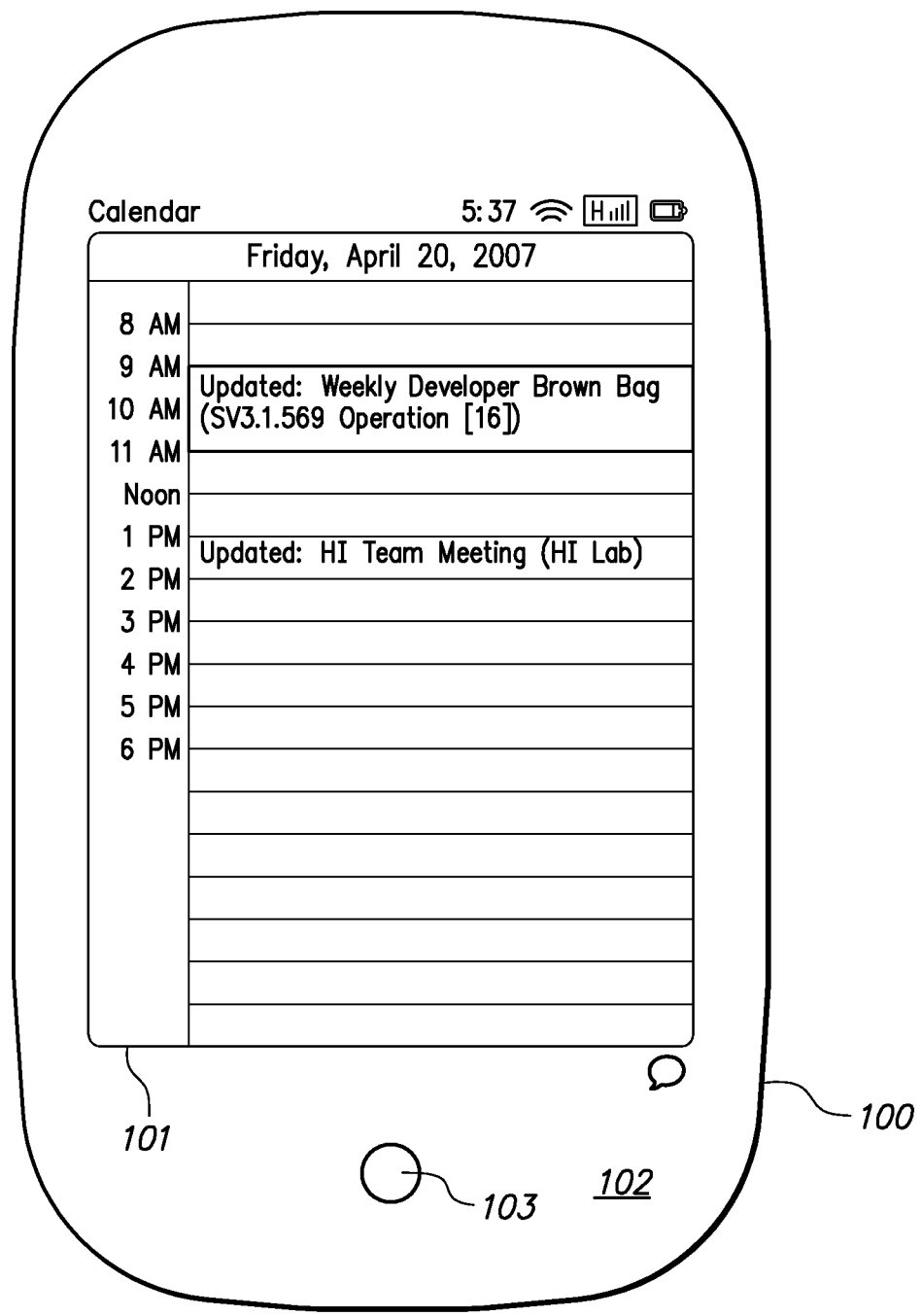
FIGS. 6A through 6F depict a sequence for switching from one card to another according to one embodiment of the present invention.
Figure 6B:
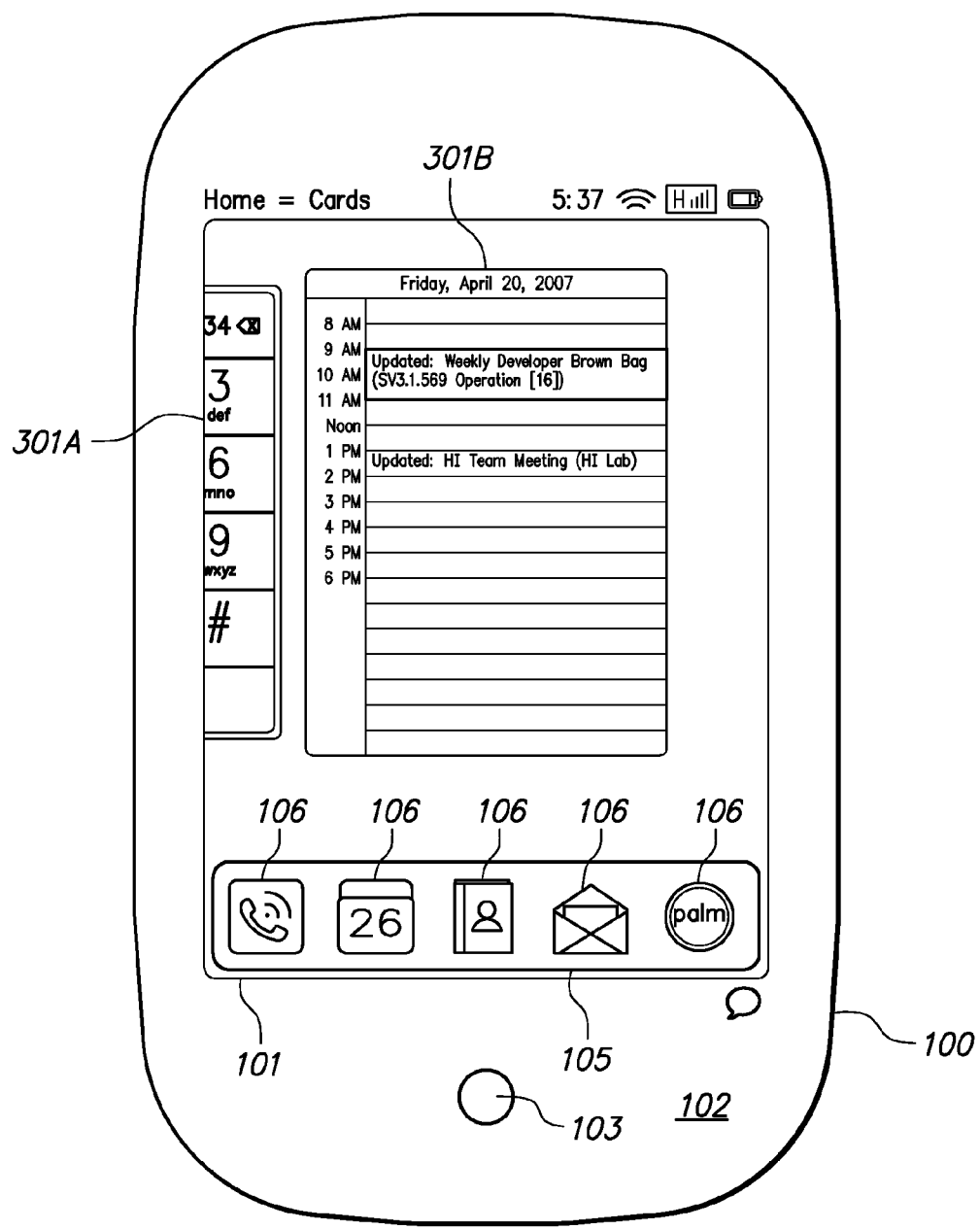
Figure 6C:
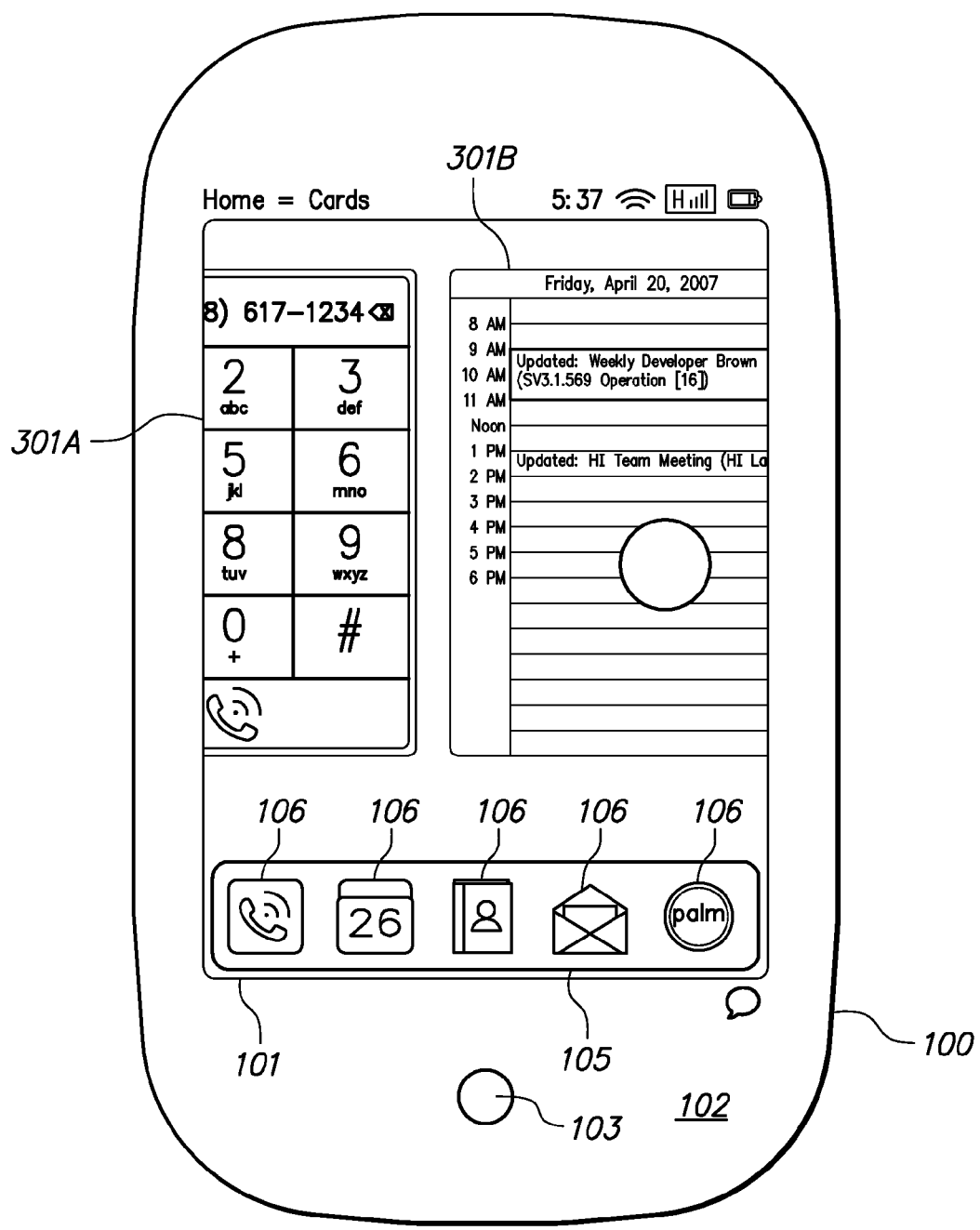
Figure 6D:
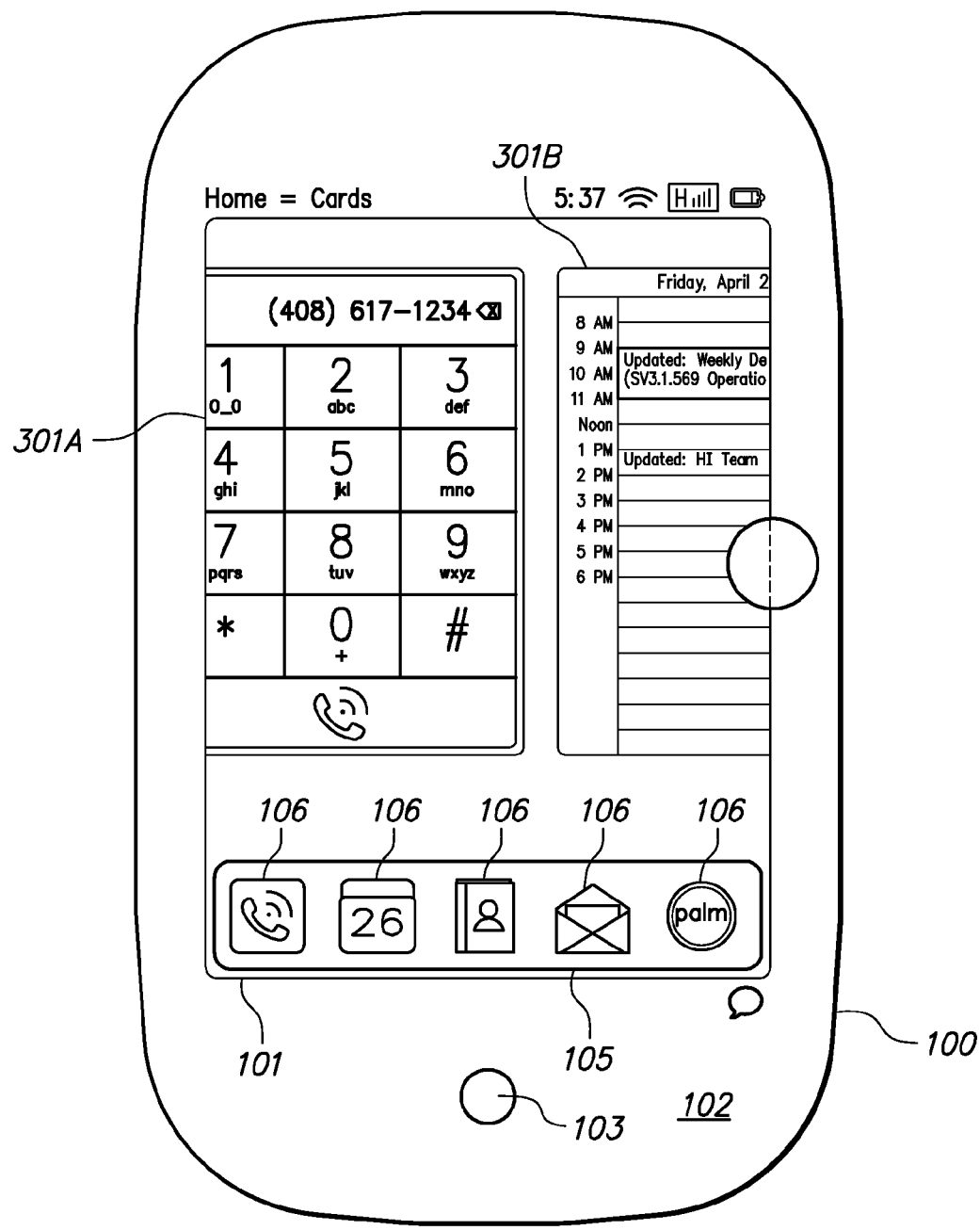
Figure 6E:
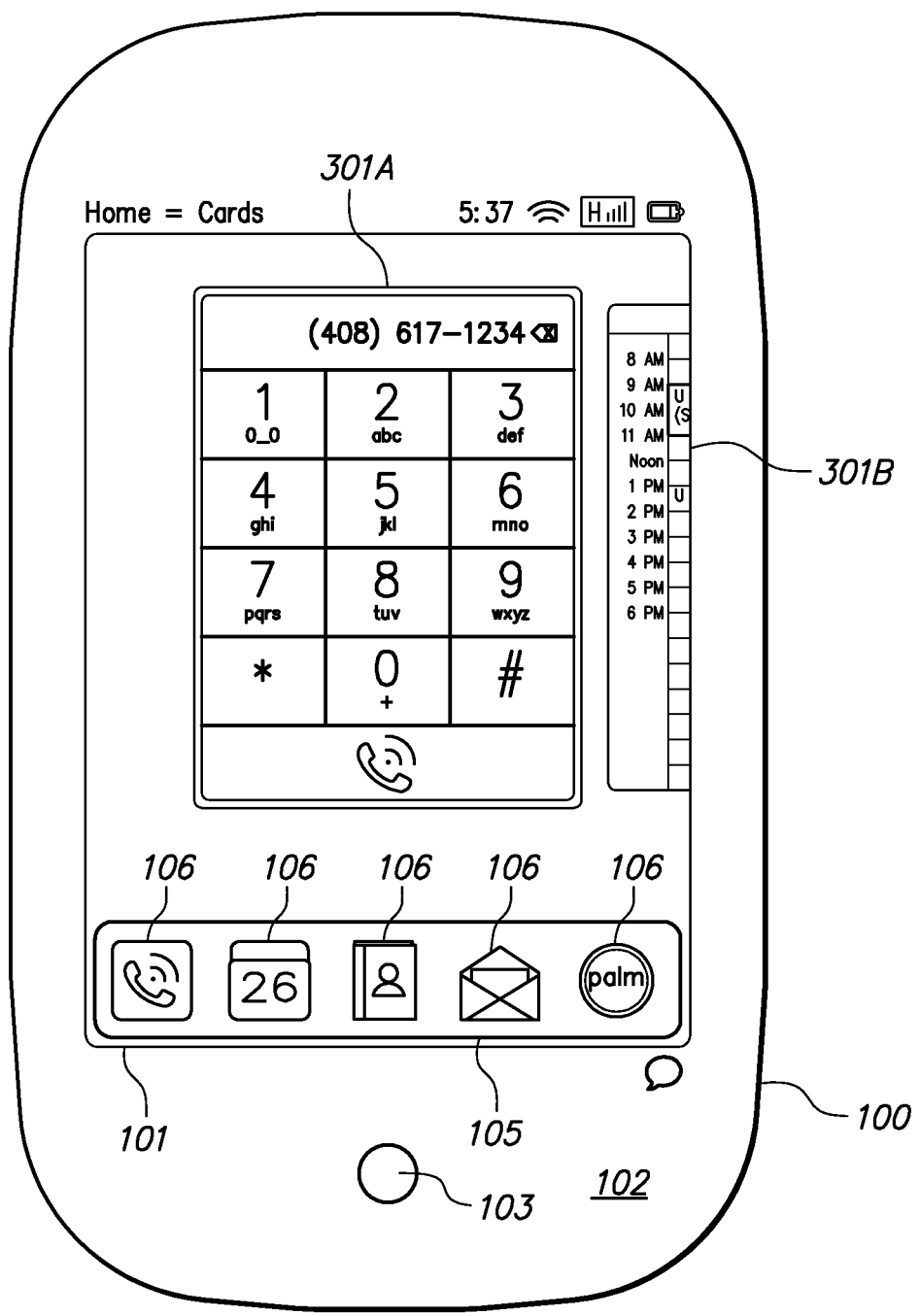

Referring now to FIGS. 6A through 6F, the operation of the invention according to one embodiment is further illustrated by way of an example of a sequence for switching from one activity to another; specifically, the user switches from a calendar application to a telephone application. FIG. 6A shows an initial state in which device 100 shows a calendar application in full-screen mode. In FIG. 6B, the user has switched to card mode, for example by pressing button 103. Now, the calendar application is visible in card 301B, and the telephone application is partially visible in card 301A. FIGS. 6C through 6E show the effect of the user dragging card 301B in a rightward direction. As the user drags card 301B, card 301A also moves in a rightward direction, until it is centrally located in display screen 101, as shown in FIG. 6E. As discussed above, this motion can also be initiated in response to the user touching the visible portion of card 301A in FIG. 6B, or by dragging in a horizontal rightward direction in gesture area 102.

Figure 6F:

Once the telephone application is in the central position in card 301A as shown in FIG. 6E, the user can tap on card 301A or press button 103 to switch to full-screen mode, as shown in FIG. 6F. In one embodiment, the user can also interact with the telephone application directly in card mode as shown in FIG. 6E.

In one embodiment, the user can launch additional activities by returning to the launch screen as shown in FIG. 1. In one embodiment, this is performed by performing a gesture or other command. In one embodiment, the user can also launch additional activities by touching an icon 106 in quick-launch area 105. In one embodiment, newly launched activities generate new cards that are added to the end of the sequence of cards shown in FIG. 7. In one embodiment, the card for the newly launched activity is, by default, given focus and presented in the central position on screen 101.

Figure 8B:
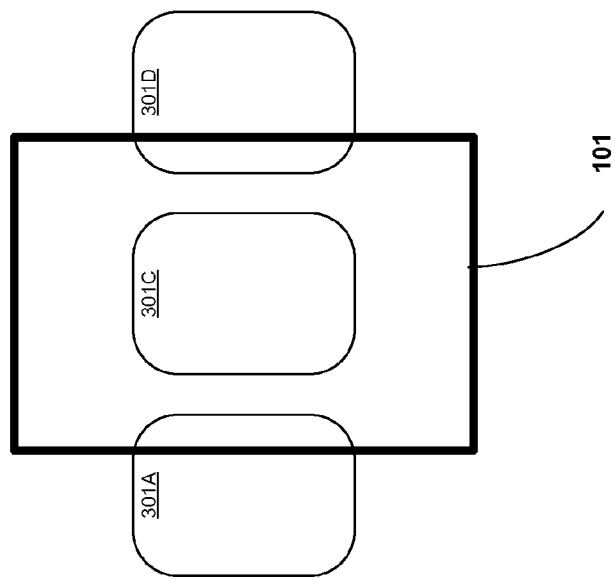
FIGS. 8A and 8B depict a sequence for dismissing a card according to one embodiment of the present invention.
Figure 8A:
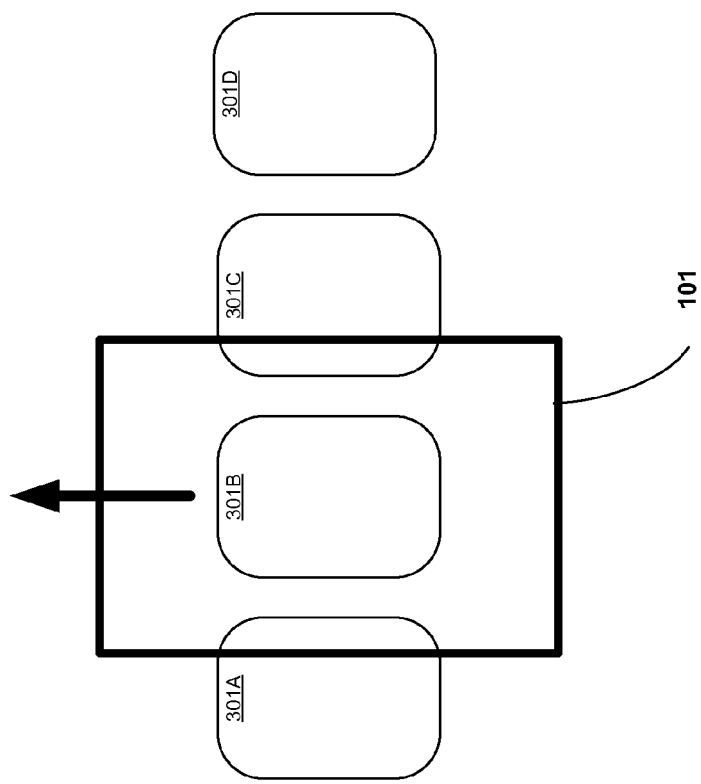

In one embodiment, the user can dismiss activities, for example by closing a card 301. In one embodiment, a card 301 can be closed by clicking on a control within the card. In another embodiment, a card 301 can be closed by dragging the card upward off screen 101, or performing a flicking action in an upward direction. Referring now to FIGS. 8A and 8B, there is shown an example of a sequence where the user drags card 301B upward off screen 101, causing card 301B to be dismissed.

As can be seen in FIGS. 8A and 8B, in one embodiment dismissing card 301B causes 301C to move leftward to fill in the gap caused by card 301B being dismissed. In general, when a card 301 is dismissed, other cards 301 move to fill the gap.

In one embodiment, dismissing a card 301 causes the application associated with the card to close. In another embodiment, the application remains open even when card 301 is closed.

In one embodiment, a card 301 might close automatically in certain circumstances. For example, if a task associated with an application is completed, or if an application crashes or terminates, the card 301 for the application can close automatically.

Figure 9A:
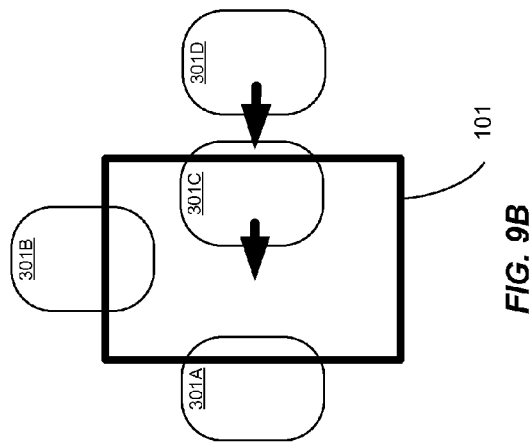
FIGS. 9A through 9D depict a sequence for rearranging cards according to one embodiment of the present invention.
Figure 9B:
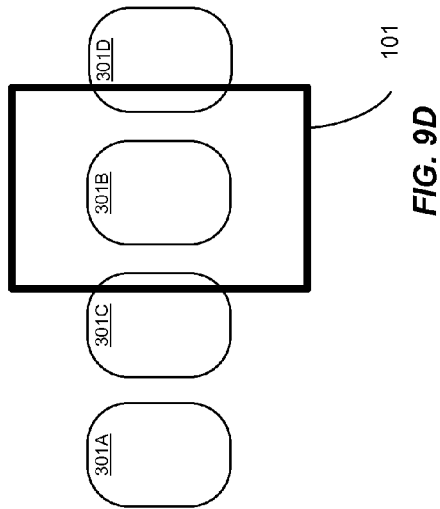
Figure 9C:
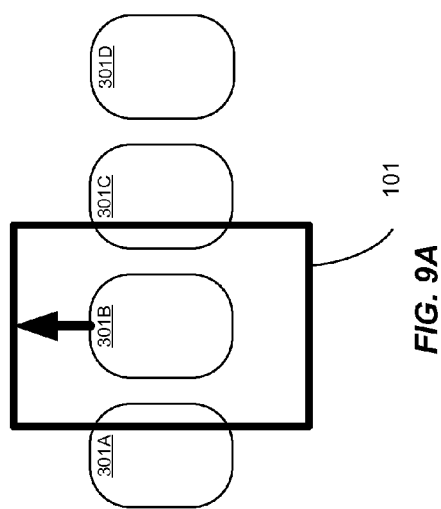
Figure 9D:
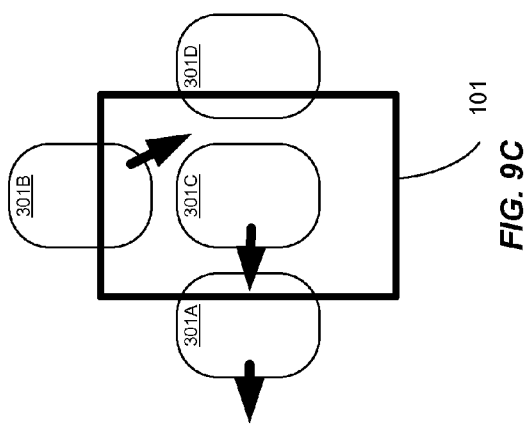

In one embodiment, the user can also rearrange cards 301 while in card mode, by tapping and holding a card 301 for a period of time (such as, for example, 500 milliseconds), and then dragging a card 301 from one position to another. An example is shown in FIGS. 9A through 9D. The user taps and holds his or her finger on card 301B, then drags card 301B upward, causing cards 301C and 301D to move to fill the gap. The user does not immediately release card 301B however; instead, he or she moves card 301B into a position between cards 301C and 301D, as shown in FIG. 9C. As the user moves the dragged card 301B between two other cards 301C and 301D, the two cards 301C and 301D separate to allow placement of the dragged card 301B. The result is the sequence shown in FIG. 9D, where card 301B is now positioned between cards 301C and 301D.

In one embodiment, some visual feedback is provided to indicate that card rearrangement is in progress; for example, the displayed cards 301 can be highlighted in some unique manner, or can include an animation or other effect, once the user has held his or her finger in the appropriate location for at least the specified period of time.

Once the movement action has been initiated, the user can continue to drag card 301 in any direction in order to place card 301 at the desired position within the sequence of cards 301. The sequence of cards 301 scrolls left or right in response to the dragging operation; for example, if the user drags card 301 near the right edge of the screen, the sequence scrolls to the left to cause additional cards 301 in the sequence to be shown while others scroll off the screen. When the user releases card 301, ending the drag operation, card 301 is placed at the indicated position, thus completing the card sequence rearrangement action.

Shuffle Mode

In one embodiment, an additional mode, referred to as "shuffle" mode, provides the user with another mechanism for viewing and rearranging cards. In one embodiment, in shuffle mode, cards 301 are shown at a reduced size, thus permitting more cards 301 to be shown on screen 101 simultaneously.

In one embodiment, when device 100 is in shuffle mode, cards 301 are arranged linearly as they are in card mode. The user can rearrange cards 301 as described above for card mode, and substantially all of the behaviors described above with respect to card mode also apply to shuffle mode. Thus, when the user drags a card 301 to the left or right within display screen 100, other cards 301 move in concert with the dragged card 301. Shuffle mode provides a way to rearrange cards while being able to view more cards 301 simultaneously.

Figure 10A:
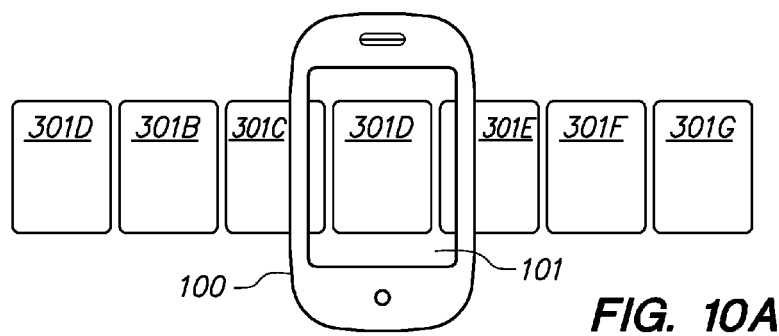
FIG. 10A depicts the display screen in card mode according to one embodiment of the present invention.
Figure 10B:
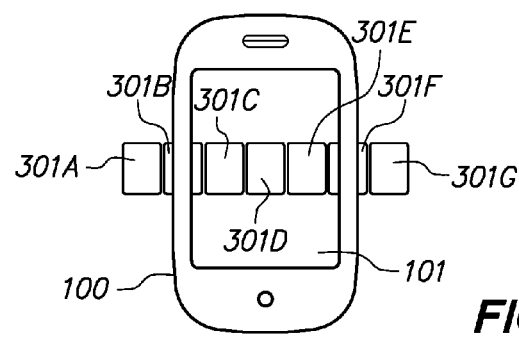
FIG. 10B depicts the display screen in shuffle mode according to one embodiment of the present invention.

A comparison of FIGS. 10A and 10B provides an example of the differences between card mode and shuffle mode. Referring now to FIG. 10A, there is shown display screen 101 in card mode according to one embodiment of the present invention and as described above; here, seven cards 301 are currently open, although only one card 301D is shown in full, with portions of two adjacent cards 301C, 301E also being shown. Cards 301A, 301B, 301F, and 301G are shown in FIG. 10A for illustrative purposes to depict their positional relationship with visible cards 301C, 301D, 301E, even though cards, 301B, 301F, and 301G are off-screen and not currently visible on screen 101.

Referring now to FIG. 10B, there is shown display screen 101 in shuffle mode for the same seven cards 301 that were included in FIG. 10A. Here, three cards 301C, 301D, and 301E are shown in full, with portions of two adjacent cards 301B, 301F also being shown. In one embodiment, the sizes of the cards are reduced so that the additional displayed cards fit on screen 301. One skilled in the art will recognize that the particular number of cards 301 visible on the screen can vary from one embodiment to another, and that the particular display of three fully visible cards, plus two partially visible cards, is merely exemplary of one embodiment.

In one embodiment, any number of cards 301 can be completely visible within screen 101. For example, as shown, three cards 301 might be completely visible, with additional partially-visible cards 301 on either side. Alternatively, five cards 301 might be completely visible, with additional partially-visible cards 301 on either side.

Figure 10C:
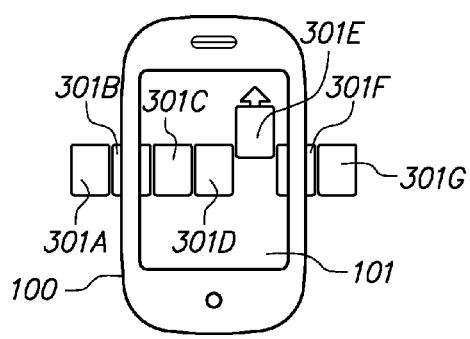
FIG. 10C depicts dismissal of a card in shuffle mode according to one embodiment of the present invention.

In one embodiment, the user can interact with cards 301 in shuffle mode in substantially the same manner as in card mode. Cards 301 can be moved back and forth, and a positional relationship among cards 301 is maintained. Cards 301 can be rearranged within the sequence by dragging and dropping. A card 301 can be closed, and its activity dismissed, by dragging the card 301 upward off screen 101, or performing a flicking action in an upward direction, in a manner similar to the operation described above in connection with FIGS. 8A and 8B. For example, referring now to FIG. 10C, there is shown an example of an upward drag or flicking action to dismiss card 301E. Upon dismissal of card 301E, card 301F would shift to the left to occupy the space formerly occupied by card 301E, and card 301G would move to the left to maintain consistent spacing among cards.

Figure 10D:
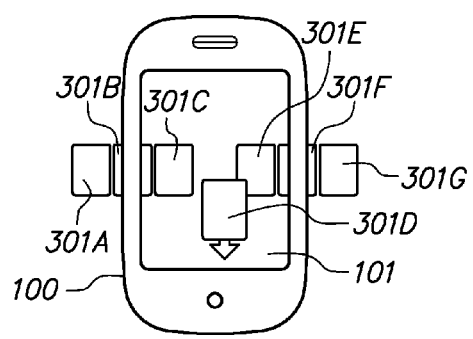
FIG. 10D depicts reordering of a card in shuffle mode according to one embodiment of the present invention.

In one embodiment, while in shuffle mode, the user can initiate rearrangement of the card sequence without necessarily first performing a tap-and-hold input operation for some period of time. For example, as shown in FIG. 10D, the user can immediately initiate a rearrangement of cards 301 by dragging a card 301D downward; the user need not tap-and-hold for some period of time. If the user wishes to tap-and-hold, he or she can still initiate the rearrangement operation by doing so. In either case, once the rearrangement operation has commenced, the user can drag in any desired direction while continuing to hold his or her finger on screen 101; the display of cards 301 scrolls left or right as appropriate when the user's finger approaches the right- or left-most edge of screen 101.

While card rearrangement is taking place, cards 301 shift position to fill gaps, in a manner similar to that described above in connection with FIGS. 9A through 9D for card view. Thus, in shuffle view, if the user drags card 301D downwards a sufficient amount, as shown in FIG. 10D, card 301E would move to the left to fill the gap. As the user moves the dragged card 301D between two other cards, the two cards would separate to allow placement of the dragged card 301D.

In one embodiment, in shuffle mode, cards 301 show applications or other activities in operation. Thus, as the user navigates among cards 301, he or she can see the actual live application or other activity within each card 301.

Grid Mode

As mentioned above, in one embodiment, both card mode and shuffle mode present cards 301 in a linear arrangement. In one embodiment, a grid mode is available that allows a user to see more cards 301 on screen 101 by presenting cards 301 in a two-dimensional grid.

Figure 10E:
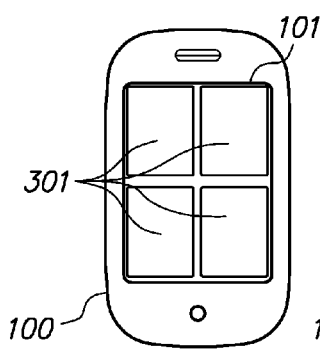
FIGS. 10E, F, and G depict various examples of grid mode according to embodiments of the present invention.

Referring now to FIG. 10E, there is shown an example of screen 101 containing four open cards 301 in grid mode.

Figure 10F:
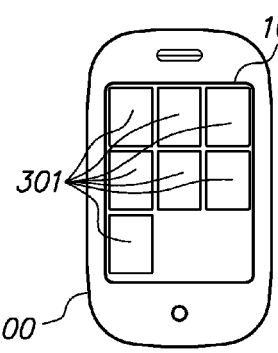

In one embodiment, when in grid mode, cards 301 are presented at a size that permits all cards 301 to be displayed simultaneously. Thus, for example, in FIG. 10F, cards 301 are shown at a smaller size than the size used in FIG. 10E, so that all nine cards 301 can be shown simultaneously. As cards 301 are dismissed or launched, cards 301 can be scaled appropriately to permits all cards 301 to be displayed simultaneously.

Figure 10G:
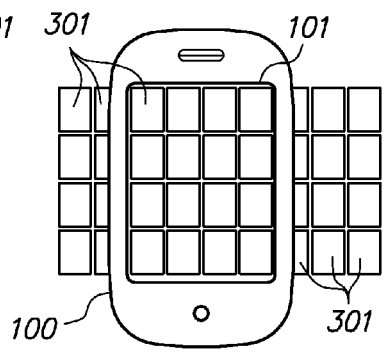

In one embodiment, in grid mode, a minimum card 301 size (or a maximum number of displayed cards 301) is enforced, even if this means that only a subset of cards 301 can be displayed. Thus, in effect, once cards 301 have been scaled down to the minimum size (or once the maximum number of displayed cards 301 is shown on screen 101), no further downward scaling takes place. Rather, scrolling is permitted to allow the user to access remaining non-displayed cards 301. Some visual indication can be provided to inform the user that additional cards 301 can be accessed via scrolling, for example by showing the edges of cards 301 that are off-screen. The user can scroll, for example, by moving cards 301 to the left or right, or performing a gesture in gesture area 102, or by any other known means. In the example of FIG. 10G, scrolling is implemented in a horizontal direction, so that the off-screen cards 301 are positioned to the left and to the right of the displayed cards 301; however, one skilled in the art will recognize that scrolling can be implemented in any desired direction, and/or in two or more directions if desired.

Figure 14:
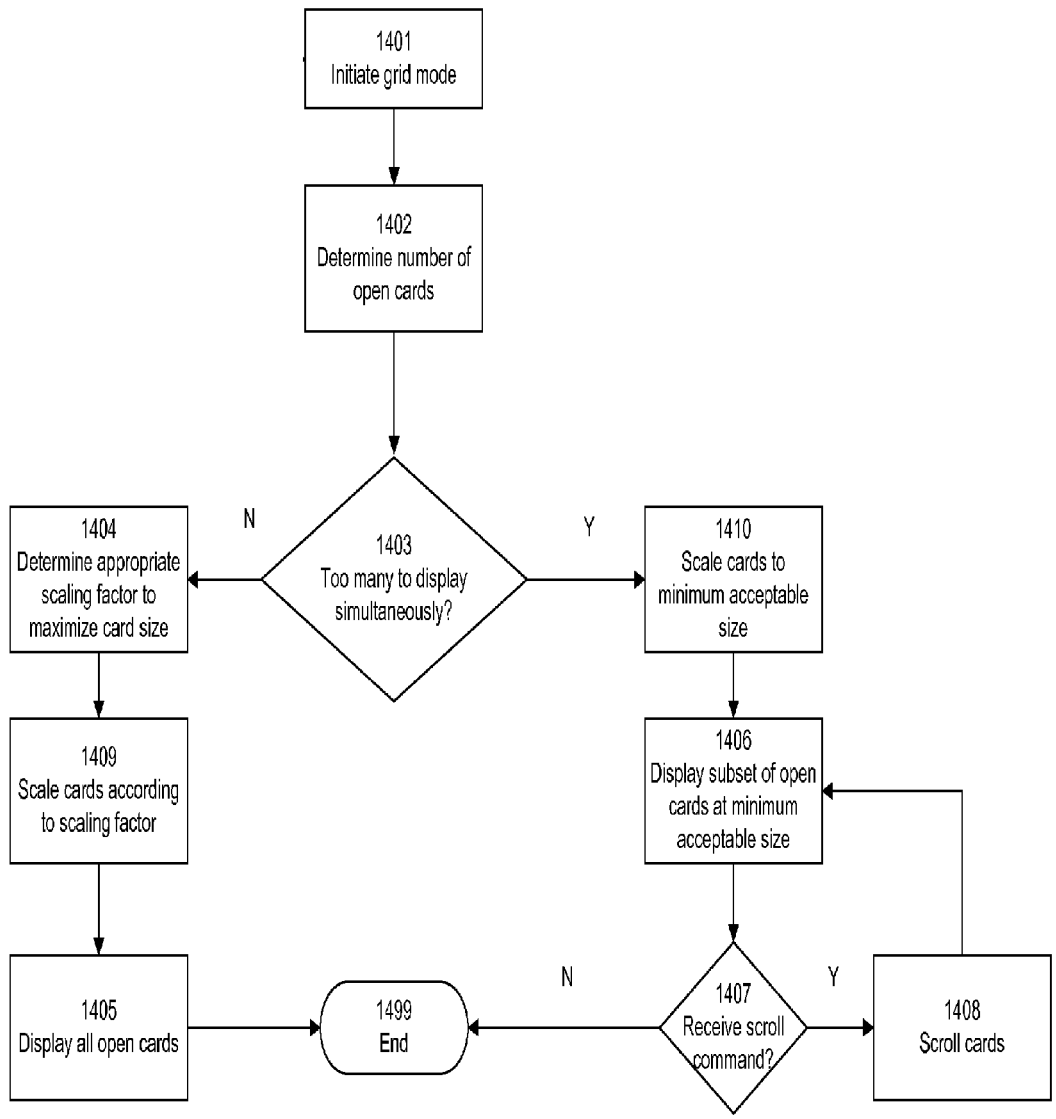
FIG. 14 is a flow diagram depicting a method for presenting cards in grid mode according to one embodiment.

Referring now to FIG. 14, there is shown an example of a method for presenting cards 301 in grid mode according to one embodiment. Grid mode is initiated 1401, for example in response to user input. Device 100 determines 1402 the total number of open cards 301. Device 100 then determines 1403 whether the number of open cards 301 exceeds a maximum number to display on screen 101; this maximum number may depend on, for example, the size of screen 101, the available resolution, a minimum acceptable size for cards 103, and/or other factors.

If the number of open cards 301 does not exceed the maximum number, then device 100 determines 1404 an appropriate scaling factor to maximize screen size. As described above, in one embodiment, cards are shown at a size that permits all cards 301 to be displayed simultaneously (as long as cards 301 are at least the minimum acceptable size). Device 100 scales 1409 cards 301 according to the scaling factor, and displays 1405 all open cards 301.

If the number of open cards 301 exceeds the maximum number, then device 100 scales 1410 cards 301 to the minimum acceptable size, and displays 1406 a subset of open cards 301 at the minimum acceptable size. Non-displayed cards 301 can be accessed via scrolling. A scroll bar or other scroll mechanism can be shown; alternatively, a user can scroll by dragging cards 301 in a particular direction. If a scroll command is received 1407, device 100 scrolls 1408 the cards so that a different subset of cards 301 is displayed. Scrolling can take place repeatedly, if desired.

In one embodiment, in grid mode, shuffle mode, and card mode, cards 301 show live, real-time information and can be interacted with in the same manner as in full-screen mode. In other embodiments, in at least some of these modes, cards 301 are presented in a "frozen" or static form.

Switching Among Modes

In one embodiment, the user can switch among modes pressing physical button 103 or some other button on device 100. In another embodiment, the user can touch or double-tap a card 301 in shuffle mode to initiate a switch to full-screen mode or to card mode. In yet another embodiment, device 100 switches from shuffle mode to full-screen mode (or to card mode) after some period of inactivity. Other mechanisms can also be provided for switching among the modes. In one embodiment, a transition effect is performed when switching from one mode to another.

In another embodiment, the user can switch among card mode, shuffle mode, and grid mode by tapping in a designated area on screen 101. In one embodiment, the designated area is any area not occupied by any card 301. In another embodiment, the designated area is an area below cards 301.

In yet another embodiment, when in card mode, tapping the area below the row of cards causes a switch to shuffle mode, whereas, when in shuffle mode, tapping any area not occupied by a card 301 causes a switch to card mode. In other embodiments, other user input actions can cause a switch between the modes, including for example, entering a gesture, typing a key on a keyboard, pressing a button, selecting a menu command, activating an on-screen button or other element, or the like.

In another embodiment, the user can switch among the various modes by performing a gesture. One example of such a gesture is a "swipe up" gesture beginning in gesture area 102 and extending onto screen 101. In one embodiment, such a gesture switches from full-screen mode to card mode, or from card mode to shuffle mode, or from shuffle mode to grid mode. In another embodiment, such a gesture switches from full-screen mode to card mode, or from card mode to grid mode. In yet another embodiment, such a gesture switches from full-screen mode to card mode, or from card mode to a launcher screen.

Another example of a mode change gesture is a "swipe down" gesture beginning on screen 101 and extending onto gesture area 102. In one embodiment, such a gesture switches from grid mode to shuffle mode, or from shuffle mode to card mode, or from card mode to full-screen mode. In another embodiment, such a gesture switches from grid mode to card mode, or from card mode to full-screen mode. In yet another embodiment, such a gesture switches from a launcher screen to card mode, or from card mode to full-screen mode.

In other embodiments, other gestures can be used for mode changes; for example, a multi-finger gesture such as a pinch can be used to change from one mode to another.

In another embodiment, the user can switch among modes by initiating a mode change command, for example by touching a button on screen 101, or by pressing button 103 or some other physical button on device 100, or by selecting a mode change command from a menu.

In yet another embodiment, the user can switch from one mode to another by changing the orientation of device 100; for example, device 100 may be equipped with an orientation sensor (such as an accelerometer) that can detect such changes and change modes accordingly.

One skilled in the art will recognize that mode changes can take place in response to other types of commands, contexts, and/or environmental factors.

Auto-Rearrangement of Cards

In some embodiments, device 100 may automatically rearrange cards 301 in response to certain user actions. For example, if the user attempts to launch an activity that already has an open card 301, that card 301 may, in some embodiments, be moved to whatever position would be used for a newly launched activity. In one embodiment, the new position for the card 301 would be the rightmost position in the sequence of cards 301. This may be desirable in order to maintain consistency with regard to the user's expectation that a newly launched activity is positioned at the rightmost position in the sequence.

Figure 11A:
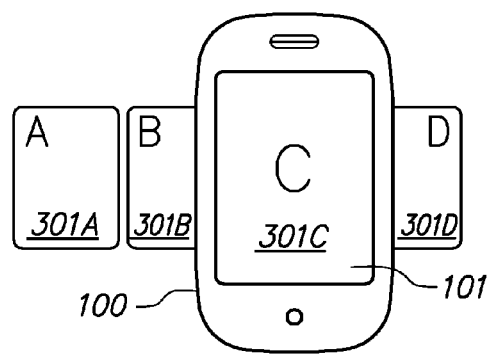
FIG. 11A depicts the display screen in full-screen mode wherein four cards are open, one of which has focus, according to one embodiment of the present invention.

Referring now to FIGS. 11A through 11D, there are shown examples of such a technique along with related behaviors. In FIG. 11A, there is shown an example of display screen 101 in full-screen mode wherein four cards 301 are open, one of which 301C has focus, according to one embodiment of the present invention. As before, additional open cards 301A, 301B, 301D are depicted in FIG. 11A for illustrative purposes only, but are not currently displayed on display screen 101.

Figure 11B:
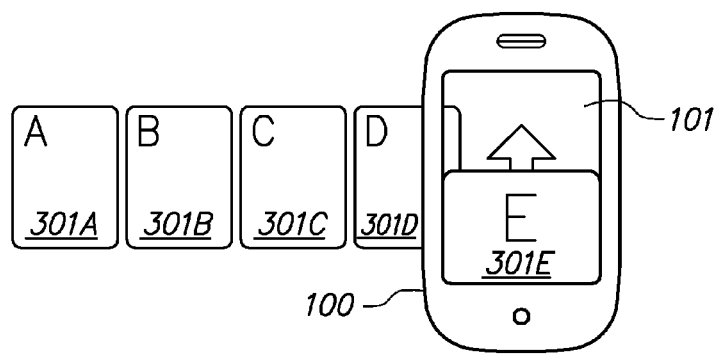
FIG. 11B depicts introduction of a new card in full-screen mode, in response to launch of a new activity, according to one embodiment of the present invention.

In FIG. 11B, new card 301E is introduced, for example in response to the user launching a new activity via an application launch screen. In one embodiment, new card 301E is positioned at the rightmost position in the sequence of cards 301, although one skilled in the art will recognize that other positions for new card 301E can be used. For example, new card 301E can be positioned at the leftmost position, or at some other location such as adjacent to the card 301 that was most recently displayed at the time the new activity was launched.

In addition, in one embodiment and as shown in FIG. 11B, all cards 301 are shifted in position so that new card 301E is given focus.

Figure 11C:
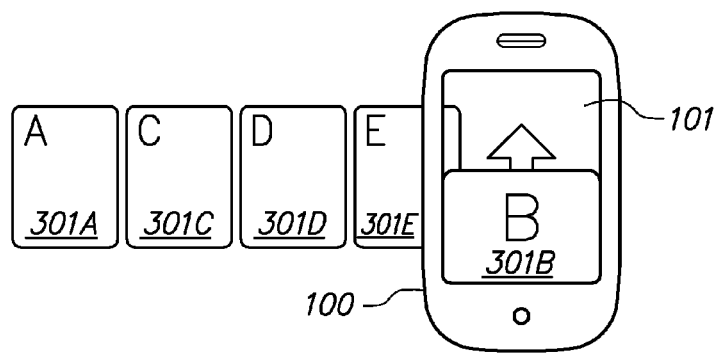
FIG. 11C depicts rearranging of a card sequence in full-screen mode, in response to launch of an activity that is already open, according to one embodiment of the present invention.

FIG. 11C depicts an example of card rearrangement that takes place in response to the user attempting to launch an activity that corresponds to a card 301B that is already open. In one embodiment, card 301B is moved to the end (rightmost position) of the card sequence. In addition, in one embodiment and as shown in FIG. 11C, all cards 301 are shifted in position so that card 301B is given focus.

Figure 11D:
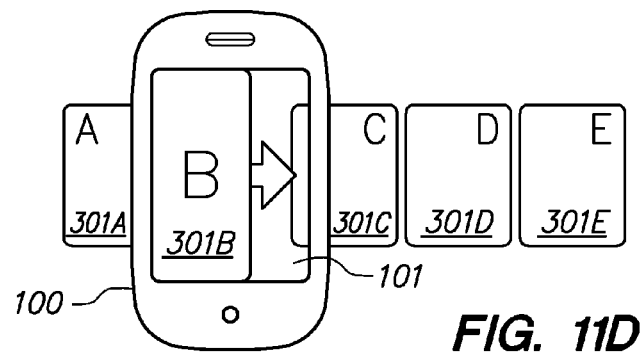
FIG. 11D depicts a focus shift without card reordering, in full-screen mode, in response to launch of an activity that is already open, according to one embodiment of the present invention.

Alternatively, it may be desirable to shift focus so that, when the user attempts to launch an activity that corresponds to a card 301B that is already open, card 301B is given focus without rearranging the card sequence. FIG. 11D depicts an example of such an embodiment, in response to the user attempting to launch an activity that corresponds to a card 301B that is already open. Here, rather than rearranging the card sequence, focus is changed and the card sequence remains unchanged.

In one embodiment, the user can select whether the card sequence should be rearranged when an activity that corresponds to an open card 301 is launched. This selection can be made in advance, such as via a preferences or options screen. Alternatively, the user can be given an option between the two behaviors at the time the activity corresponding to an open card 301 is launched. For example, the user can be presented with a dialog box noting that the activity is already open, and prompting the user to indicate whether or not to rearrange the card sequence.

Although FIGS. 11A through 11D depict device 100 in full-screen mode, one skilled in the art will recognize that the automatic rearrangement techniques described herein can be performed in any mode, including card mode, shuffle mode, and/or grid mode. In addition, the particular arrangement and appearance of screen 101, device 100, and cards 301 is intended to be exemplary and not to limit the scope of the claimed invention in any way.

Figure 15:
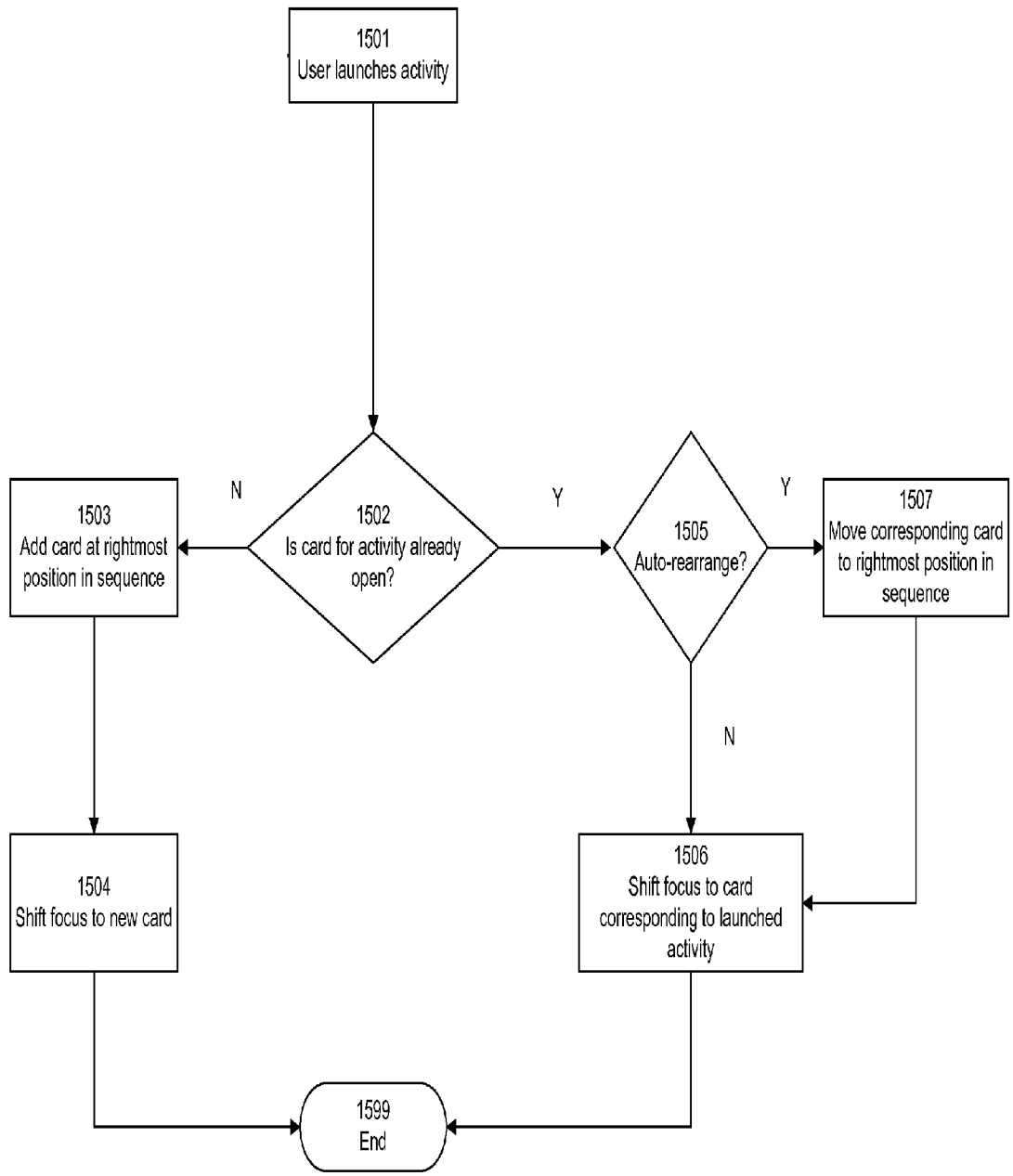
FIG. 15 is a flow diagram depicting a method for card rearrangement according to one embodiment.

Referring now to FIG. 15, there is shown a flow diagram depicting a method for card rearrangement according to one embodiment. The user launches 1501 an activity, for example by tapping on an icon in a launch screen. In step 1502, if no card 301 is already open for the launched activity, a new card 301 is opened and added 1503 to the end of the current sequence of cards 301. For example, the new card 301 can be added 1503 at the rightmost position in the current sequence of cards 301. If no cards 301 are already open, the new card 301 becomes the only card 301 in the sequence. Focus is shifted 1504 to new card 301, for example by placing new card 301 in the center of screen 101, or causing the activity represented by new card 301 to occupy substantially entire screen 101 (if in full-screen mode).

If, in step 1502, a card 301 for the launched activity is already open, device 100 determines 1505 whether it should automatically rearrange the card sequence. As discussed above, in some embodiments card sequences are automatically rearranged when an activity that corresponds to an open card 301 is launched, while in other embodiments, they are not. Alternatively, the user can be given an option to select between the two behaviors, either in advance or at the time the activity corresponding to an open card 301 is launched.

If device 100 determines 1505 that it should automatically rearrange the card sequence, the card 301 corresponding to the launched activity is moved 1507 to the end of the current sequence of cards 301 (for example, by moving the card 301 corresponding to the launched activity to the rightmost position in the sequence of cards 301).

In one embodiment, whether or not the card sequence is rearranged, focus is shifted 1506 to the card 301 corresponding to the launched activity, for example by placing the card 301 in the center of screen 101, or causing the activity represented by the card 301 to occupy substantially entire screen 101 (if in full-screen mode).

Sibling Cards

In one embodiment, when a new card 301 is opened, its placement within the sequence of cards 301 depends upon its relationship (if any) with existing open cards 301. For example, if a new card 301 is opened for an already-running activity, the new card 301 can be placed adjacent to open card(s) 301 for that application. These cards 301, referred to as "sibling cards", are therefore positioned so that cards 301 for a given activity are located adjacent to one another in the overall card sequence. For example, a new card 301 for an email application may appear when a user initiates a reply to an email message; the new sibling card 301 for the reply can be positioned adjacent to the existing card 301 for the original message. As another example, a new card 301 for a browser application can be positioned adjacent to any currently open cards 301 for the browser application. Placing related cards 301 so that they are adjacent to each other allows a user to more easily discern the relationship among cards 301 in the sequence and to navigate among cards 301.

Cards 301 can be related to one another (i.e., can be "siblings") by virtue of the fact that they are associated with a common application or activity. Alternatively, cards can be considered siblings if they relate to a particular task, thread, contact, subject, company, or operation. The sibling relationship can be inferred, or it can be established based on explicit labeling or other indication specified by a user. One skilled in the art will recognize that the mechanism for placing cards 301 according to their sibling relationship can be used regardless of the particular basis for determining a sibling relationship among cards 301.

In one embodiment, sibling cards 301 can be freely moved and/or separated as the user wishes. Thus, the initial placement of a new card 301 by virtue of its sibling relationship with open card(s) 301 does not prohibit later movement of the card 301 to a location that is not adjacent to its siblings 301.

Figure 12A:
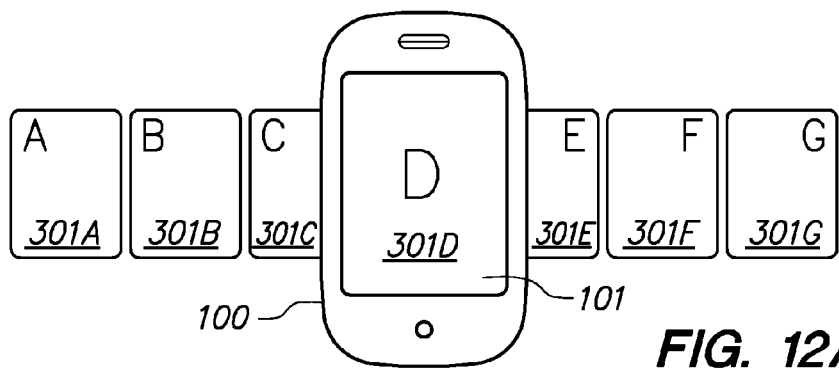
FIG. 12A depicts the display screen in full-screen mode wherein seven cards are open, one of which has focus, according to one embodiment of the present invention.
Figure 12B:
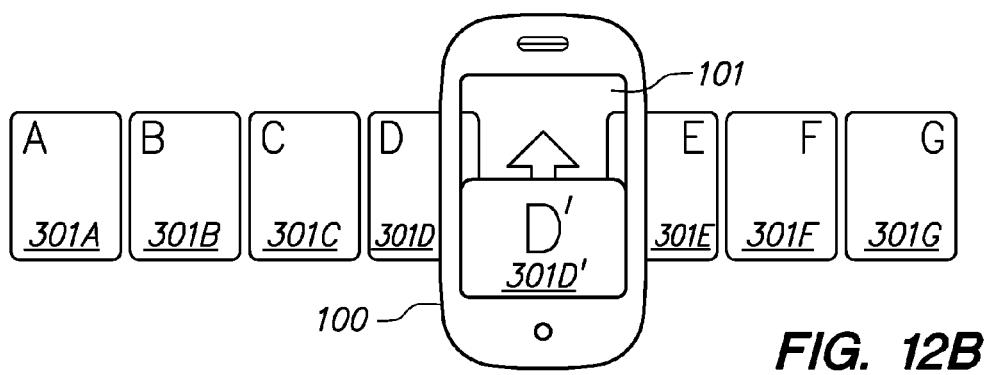
FIG. 12B depicts introduction of a sibling card for an open activity in full-screen mode, according to one embodiment of the present invention.

Referring now to FIGS. 12A and 12B, there is shown an example of placement of sibling cards 301 according to one embodiment. In FIG. 12A, seven cards 301 are open, and card 301D has focus. Device 100 is in full-screen mode, so that card 301D occupies substantially the entire screen 101.

In FIG. 12B, sibling card 301D' is introduced, for example in response to the user initiating a task that opens a new card for the activity corresponding to card 301D. For example, if card 301D includes an email message, the user's initiation of a reply message can result in new card 301D' being opened for the reply. As shown in FIG. 12B, new card 301D' is introduced at a position adjacent to card 301D within the card sequence. As shown in FIG. 12B, in one embodiment new card 301D' is given focus, and now occupies substantially the entire screen 101.

Although FIGS. 12A and 12B depict device 100 in full-screen mode, one skilled in the art will recognize that the sibling card 301 launch techniques described herein can be performed in any mode, including card mode, shuffle mode, and/or grid mode. In addition, the particular arrangement and appearance of screen 101, device 100, and cards 301 is intended to be exemplary and not to limit the scope of the claimed invention in any way.

Figure 12C:
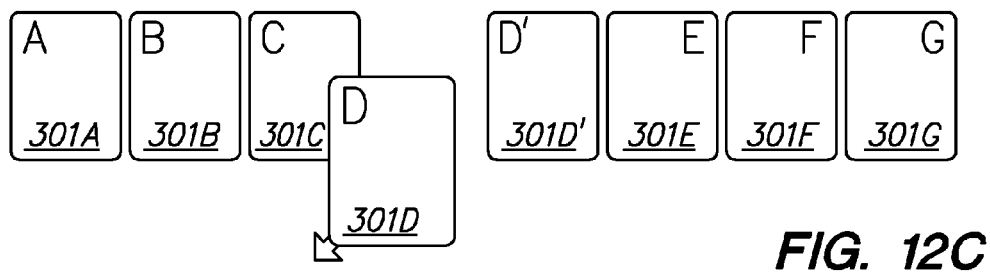
FIGS. 12C and 12D depict reordering of card to separate sibling cards in response to user input, according to one embodiment of the present invention.
Figure 12D:
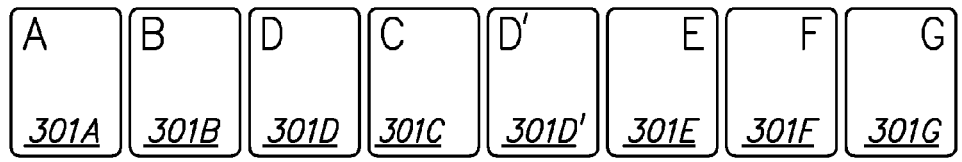

Referring now to FIGS. 12C and 12D, there is shown an example of reordering of card to separate sibling cards in response to user input, according to one embodiment of the present invention. In the example, the user drags card 301D from its initial location to a new position between cards 301B and 301C. As can be seen in FIG. 12D, in one embodiment, card 301D' remains in its original position and does not move with card 301D.

In another embodiment, sibling cards do move together, so that dragging card 301D would cause card 301D' to move as well. For example, in one embodiment, sibling cards 301 cannot be separated from one another.

In another embodiment, the user can specify whether or not sibling cards 301 should move together, either in advance via a preference screen or similar mechanism, or at the time the user initiates a card movement operation involving a card 301 having a sibling.

In another embodiment, the user can select more than one card 301 to be moved simultaneously. For example, the user can highlight two or more cards 301, and then move one of the highlighted cards 301 to cause all of them to move together. In one embodiment, selecting a card 301 that has at least one sibling causes the sibling(s) to be selected automatically, so that if the user then moves one of the selected cards 301 the siblings move as well; however, the user can deselect the selected cards 301 prior to moving the cards 301, if he or she does not want all of the sibling cards to move 301.

Card Groups

In one embodiment, cards 301 can be visually grouped with one another. Thus, cards 301 having some relationship to one another (such as cards 301 associated with a particular application or activity) can be displayed in a manner that indicates and/or reinforces the relationship. For example, cards 301 representing various web pages being viewed via a browser application can be grouped.

One example of a visual paradigm for indicating groups of cards 301 is to depict the cards 301 in a manner that resembles a stack or deck, with a fully-visible front card 301 (or "top card") and one or more additional cards 301 depicted as though they are behind the front card 301. Alternatively, card groups can be indicated in other ways that distinguish them from non-grouped cards 301: for example, card groups can be shown via a distinctive color scheme, different sizes, different vertical or horizontal positioning, bracketing, highlighting, spacing, or any other mechanism. In various embodiments as described below, a user can interact with groups, separating their constituent cards 301 as desired, creating new groups, changing the order of groups, and the like. In one embodiment, where stacking is used to indicate groups, cards 301 can be "unstacked" at times, even while preserving their group relationship, either automatically or manually to facilitate certain types of interactions and viewing of constituent cards 301. While cards 301 are unstacked, in some embodiments, an alternative mechanism, such as bracketing or distinctive coloring, is used to remind the user that the cards 301 are still members of a group. For example, in one embodiment, card groups are represented by stacks in card view, but the stacks are separated in full-screen view so that the user can see each constituent card 301 in its entirety.

Figure 13A:
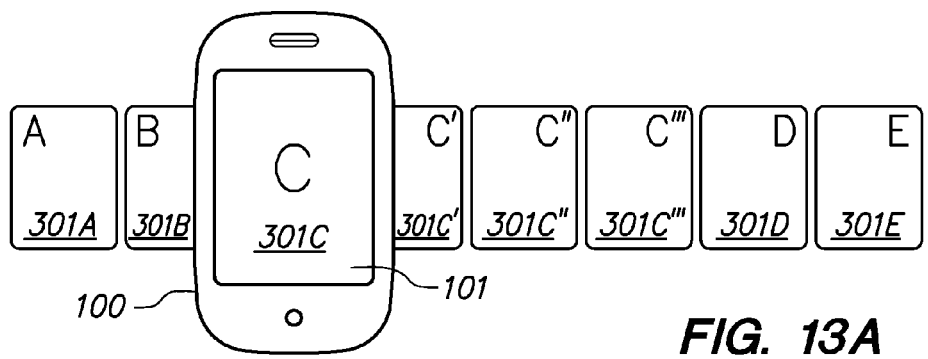
FIG. 13A depicts the display screen in full-screen mode wherein eight cards are open, one of which has focus, according to one embodiment of the present invention.

Referring now to FIGS. 13A through 13K, there are shown various examples of visual depictions of card groups and behaviors according to various embodiments. FIG. 13A depicts display screen 101 in full-screen mode. Eight cards 301A, 301B, 301C, 301C', 301C", 301C"', 301D, and 301E are open, and card 301C currently has focus. Cards 301C, 301C', 301C", and 301C"' form a card group, for example by virtue of the fact that they are all associated with a common activity or application. However, in the example of FIG. 13A, the grouping of cards 301 is not explicitly shown in full-screen mode, and cards 301 behave in the same manner as though they were not grouped with one another. One skilled in the art will recognize, however, that in other embodiments, the card group can be depicted by some visual means, such as a distinctive color, shading, border, icon, or other indicator.

Figure 13B:
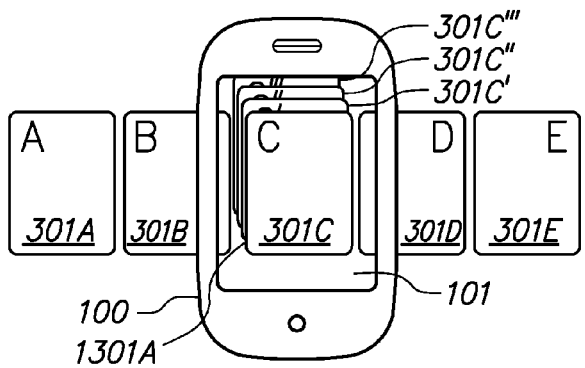
FIG. 13B depicts the display screen in card mode wherein eight cards are open, including four cards forming a group, according to one embodiment of the present invention wherein the grouped cards are depicted in a stack.

FIG. 13B depicts display screen 101 in card mode, with the same eight cards 301A, 301B, 301C, 301C', 301C", 301C"', 301D, and 301E being open, and card 301C still having focus. Here, grouped cards 301C, 301C', 301C", and 301C"' are depicted in a stack 1301A, with front card 301C shown in full and remaining cards 301C', 301C", and 301C"' being partially obscured by card 301C. In one embodiment, the order of cards 301C, 301C', 301C", and 301C"' corresponds to the order in which cards 301C, 301C', 301C", and 301C"' appeared in full-screen mode. In another embodiment, if one of the cards 301C, 301C', 301C", and 301C"' in the group was in focus at the time the user switched from full-screen mode to card mode, then the card 301 that was in focus is positioned at the front of stack 1301A, with the remaining cards 301 in the group being placed elsewhere in the stack.

In one embodiment, the user can move and manipulate stack 1301A as if it were a single card 301, including rearranging stack 1301A within the card sequence, dismissing stack 1301A, and the like. In one embodiment, the user can dismiss the entire group of cards by performing a card dismissal operation on stack 1301A (such as dragging stack 1301A up to the top of screen 101). In another embodiment, such a dismissal action only dismisses the top card in the group while leaving the remaining card(s) 301 still open (and still grouped if there are more than one). In yet another embodiment, in response to a user action to dismiss stack 1301A, the user is prompted to specify whether he or she intends to dismiss the entire group or a single card 301.

Figure 13C:
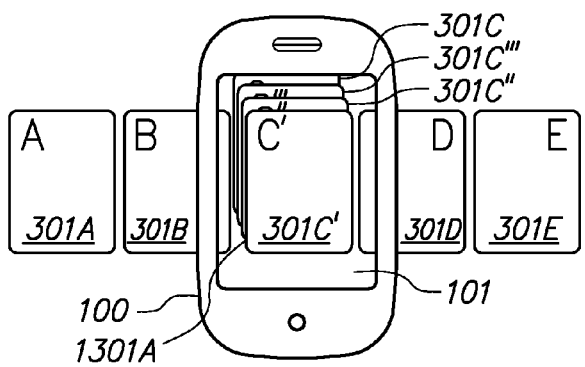
FIG. 13C depicts the display screen of FIG. 13B, wherein the cards forming the group have been reordered, according to one embodiment of the present invention.

In one embodiment, the user can cause cards 301 in a stack 1301A to be reordered, so as to bring a different card 301 to the top of the stack 1301A for ease of viewing. In one embodiment, the user drags the front card (such as card 301C in FIG. 13B) in a downward direction to rearrange the order of cards 301 in stack 1301A. In response to such an action, the front card 301 moves to the back of stack 1301A, and the card immediately behind the front card moves to the front. For example, FIG. 13C depicts display screen 101 after card 301C has been moved to the back of stack 1301A, so that card 301C' is now shown in the front position.

If the user causes a switch from card mode to full-screen mode, in one embodiment cards 301 in a stack 1301A are "unstacked" so that the full-screen mode resembles that shown in FIG. 13A. In one embodiment, upon entering full-screen mode from card mode, cards belonging to a group are placed in an order corresponding to the most recent arrangement of cards 301 in stack 1301A.

Figure 13D:
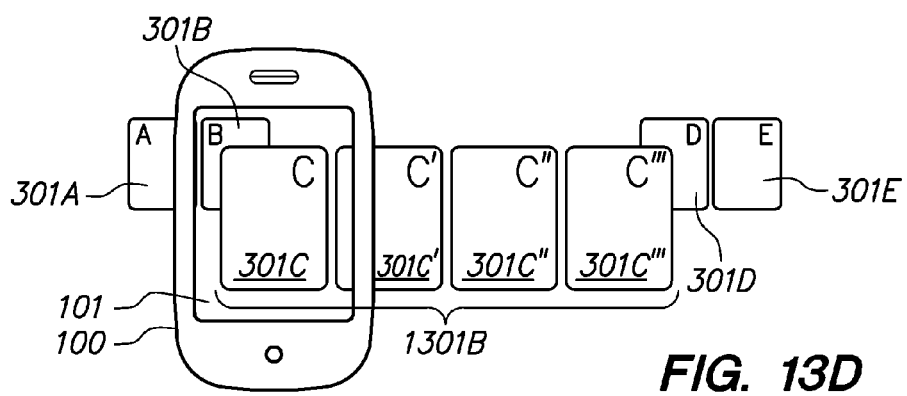
FIG. 13D depicts the display screen in card mode wherein eight cards are open, including four cards forming a group, according to one embodiment of the present invention wherein the grouped cards are depicted using a distinctive vertical offset and size.

As mentioned above, in various embodiments card groups can be shown in other ways. For example, in one embodiment, card size and/or vertical offset can be used to indicate cards 301 that are part of a group. For example, in FIG. 13D, cards 301C, 301C', 301C", and 301C"' are shown at a larger size and at a different vertical offset compared with other cards 301A, 301B, 301D, 301D, 301E; this indicates that cards 301C, 301C', 301C", and 301C"' form part of group 1301B. The particular vertical offsets and sizes shown in FIG. 13D are merely exemplary.

In one embodiment, some of the cards 301 in the group are shown in front of, and partially obscuring, other cards 301 that are not part of the group. For example, in FIG. 13D, card 301C partially obscures card 301B (which is not part of group 1301B); similarly, card 301C"', if it were brought within display 101, would partially obscure card 301D. In one embodiment, obscured cards 301 are brought into full view if and when they are given focus.

Figure 13E:
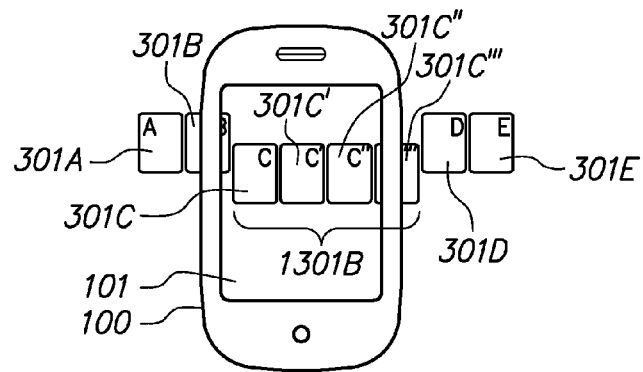
FIG. 13E depicts the display screen in shuffle mode wherein eight cards are open, including four cards forming a group, according to one embodiment of the present invention wherein the grouped cards are depicted using a distinctive vertical offset.
Figure 13F:
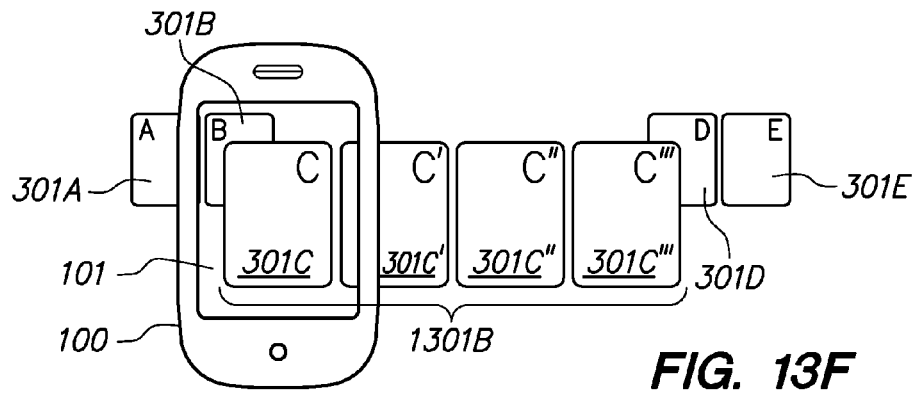
FIGS. 13F and 13G depict an example of a transition from view in which one of the members of a group has focus to a view in which the card having focus is not part of a group, according to one embodiment of the present invention.
Figure 13G:
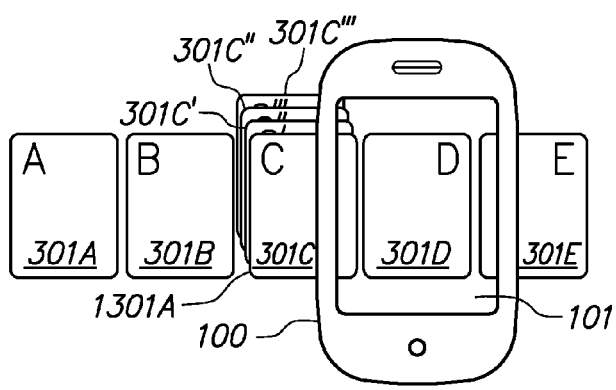
Figure 13H:
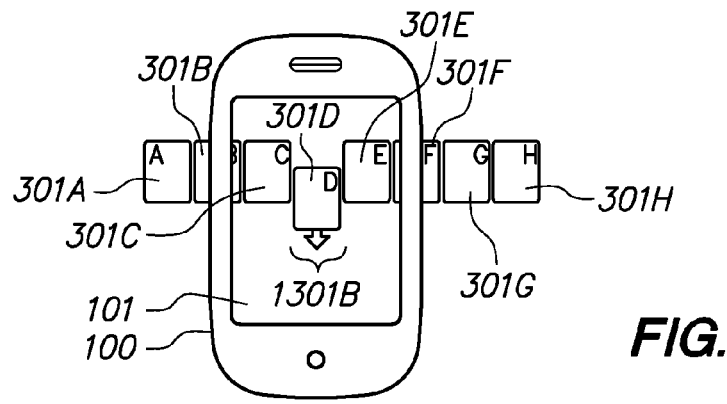
FIGS. 13H through 13K depict an example of creation of a new card group and adding cards to the group, according to one embodiment.

In one embodiment, if focus changes so that the card 301 in focus is not a member of group 1301B, the depiction of group 1301B changes to a stack view. Thus, in this embodiment, the mechanism for depicting groups in FIG. 13D is only used when a member of the group is in focus; otherwise, the group is shown as a stack. In general, in one embodiment, the depiction of a stack can change from one view to another depending on whether a card 301 in the stack is currently in focus. Referring now to FIGS. 13F and 13G, there is shown an example of a transition from view in which one of the members of group 1301B has focus to a view in which the card having focus is not part of a group. In FIG. 13F, card 301C (which is a member of group 1301B) has focus; accordingly, the members of group 1301B are indicated using a vertical offset and size differential as compared with other cards 301. In FIG. 13G, card 301D (which is not a member of group 1301B) has focus; accordingly, the members of group 1301B are indicated as stack 1301A.

In one embodiment, card size and/or vertical offset can be used to depict card groups in both card mode and shuffle mode. In another embodiment, card groups are depicted in card mode by vertical offset and distinctive card size (as shown in FIG. 13D), but are depicted in shuffle mode by vertical offset without changing the card size. An example of such an arrangement is shown in FIG. 13E, which depicts screen 101 in shuffle mode. In FIG. 13E, cards 301C, 301C', 301C", and 301C''' are shown at a different vertical offset compared with other cards 301A, 301B, 301D, 301D, 301E, so as to indicate that cards 301C, 301C', 301C", and 301C''' are members of group 1301B. However, in this example, all cards 301 are shown at the same size.

In one embodiment, cards 301 are automatically grouped with one another, for example when several cards 301 are associated with a common application or other activity. In one embodiment, the user can manually add cards 301 to groups, or remove cards 301 from groups. In shuffle mode and/or in card mode, a user can add a card 301 to a group by dragging the card 301 to an area of the screen occupied by a card group. Referring now to FIGS. 16A through 16D, there is shown an example wherein the user drags card 301B to a position within group 1301B between cards 301C' and 301C"; this causes card 301B to be added to group 1301B, at a position between cards 301C' and 301C". The example depicts the operation in card mode, although it can also be performed in a similar manner in shuffle mode.

In shuffle mode and/or in card mode, a user can remove a card 301 from a group by dragging the card 301 to an area of the screen not occupied by a card group. Referring now to FIGS. 17A through 17D, there is shown an example wherein the user drags card 301C' to a position between cards 301D and 301E; this causes card 301C' to be removed from group 1301B, and placed at a position between cards 301D and 301E. The example depicts the operation in card mode, although it can also be performed in a similar manner in shuffle mode. In one embodiment, upon completion of the operation, card 301C' would be in focus; accordingly card 301C' (as well as adjacent cards 301D and 301E) would be shown at regular card-view size. Also, in one embodiment, as described above, remaining cards 301C, 301C", and 301C''' in group 1301B would form a stack since they are no longer in focus.

Figure 13I:
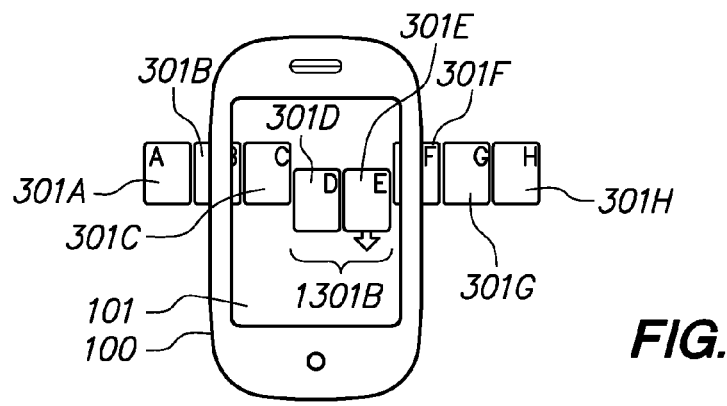
Figure 13J:
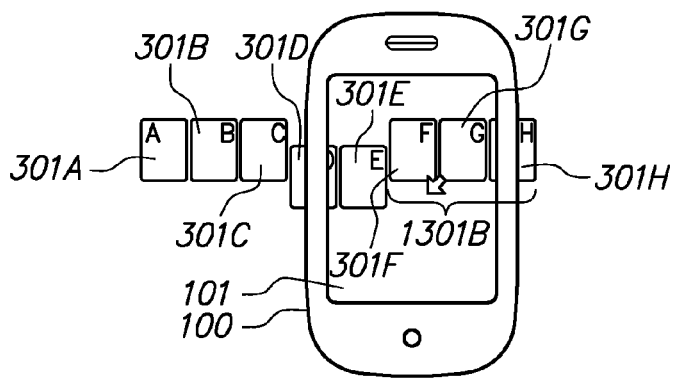
Figure 13K:
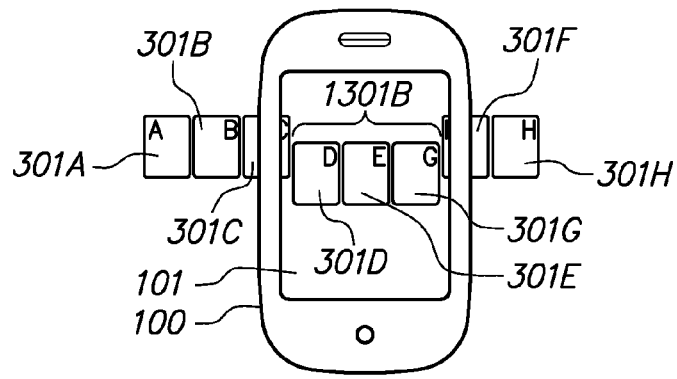

In one embodiment, a user can manually create a new group and add cards 301 to it. For example, referring now to FIG. 13H, while in shuffle mode, the user drags card 301D downward slightly; this creates new group 1301B containing the single card 301D. Card 301D then remains in an offset position with respect to other cards 301, to indicate its membership in group 1301B. Referring now to FIG. 13I, the user drags another card 301E downward to add it to existing group 1301B. Referring now to FIG. 13J, the user drags another card 301G downward to add it to existing group 1301B; as shown in FIG. 13K, the card sequence is rearranged so that cards 301D, 301E, and 301G are positioned adjacent to one another.

One skilled in the art will recognize that the technique depicted in FIGS. 13H through 13K is merely exemplary, and that other techniques can be used for creating groups and adding cards 301 to groups. For example, a button, pull-down menu, gesture, or other user input mechanism can be used to activate a "create group" command. Alternatively, a user can place a finger on each of two or more cards 301 to be grouped together, and pinch the fingers together to create a new group including the two or more cards 301. Alternatively, a user can group two or more cards by dragging one card 301 onto another. Subsequently, additional cards 301 can be added to the group by dragging or by additional pinching input operations.

In one embodiment, visual feedback is provided while a user is dragging a card 301 onto a group or otherwise performing an input operation that can add a card 301 to a group. For example, a distinctive highlighting effect, such as a glow, can be applied to a group while the user drags a card 301 onto the group but before he or she completes the drag-and-drop operation. This highlighting effect can serve to inform the user that, if he or she drops the card 301 it will be placed in the group.

In one embodiment, the vertical offset at which a user drops a card 301 is relevant only when it is needed to disambiguate a card rearrangement action from an action intended to add/remove a card 301 to/from a group. For example, if a user drags and drops a card 301 between two cards 301 that are already part of a group, then the vertical offset of the card being dragged is not relevant; once dropped, the card 301 joins the group. On the other hand, if a user drags and drops a card 301 between a card 301 that is part of a group and an adjacent card that is not part of the group, the vertical offset of the card at the time it is dropped is relevant to determining whether to a) add the card 301 to the group or b) move the card 301 to a location adjacent to (but not part of) the group.

For example, referring again to FIG. 13K, if a user drags and drops card 301A to a location between cards 301E and 301G, card 301A joins group 1301B regardless of the vertical position of card 301A at the time it is dropped. However, if the user drags and drops card 301A to a location between cards 301G and 301F, the vertical position of card 301A determines whether card 301A joins group 1301B. Specifically, if the vertical position approximates the vertical position of card 301F, then card 301A does not join group 1301B but is placed, ungrouped, to the left of card 301F. However, if the vertical position more closely approximates the vertical position of card 301G, then card 301A joins group 1301B and is placed to the right of card 301G within group 1301B.

In one embodiment, a user can turn card grouping on or off, for example via a preferences or options screen. If card grouping is turned off, all cards 301 are represented singly and without reference to groups. In one embodiment, grouping relationships are preserved internally when card grouping is turned off, so that the groups can be reestablished if card grouping is later turned on.

In one embodiment, groups can be nested, so that a group can contain another group as one of its members. Any number of levels of such nesting can be implemented. In one embodiment, successively nested groups can be indicated, for example, by different offsets in vertical position on screen 101.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for performing the above-described techniques.

The various features described above can be implemented singly or in any combination, as will be apparent to one skilled in the art.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be down-loaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer system comprising:
   a physical button;
   a processor coupled to the physical button;
   a touch-sensitive display screen coupled to the processor, the processor to receive gesture input on the touch-sensitive display screen and operate the computer system in any one of at least two display modes, wherein:
      during a given duration, the processor operates at least a first application and a second application concurrently;
      in a full-screen mode, the processor provides, on the touch-sensitive display screen, a user interface for only one of either the at least first application or the second application;
      in a windowed mode, the processor:
         provides on the touch-sensitive display screen, a first card corresponding to the first application, and a first portion of a second card so that a second portion of the second card is not visible on the touch-sensitive display screen, the second card corresponding to the second application, wherein at least the first card displays content from operation of the first application, the content corresponding to (i) an output from an application, (ii) a task, (iii) a message, (iv) a document, or (v) a web page;
         responds to a directional contact along a first direction on the touch-sensitive display screen by changing a position of the first card relative to the touch-sensitive display screen in the first direction; and
         responds to a directional contact of moving the first card or the second card along a second direction that is different than the first direction on the touch-sensitive display screen by (i) identifying one of the first card or second card as being selected based on the directional contact along the second direction, and (ii) dismissing the selected first card or second card from the touch-sensitive display screen in the second direction so that the corresponding first application or second application is closed;

wherein the processor, in response to receiving user input via the physical button, transitions the computer system at least (i) from the full-screen mode to the windowed mode, or (ii) from the windowed mode to the full-screen mode.

2. The computer system of claim 1, wherein the first direction is substantially horizontal on the touch-sensitive display screen, and wherein the second direction is substantially vertical on the touch-sensitive display screen.

3. The computer system of claim 1, wherein the second direction is substantially upwards.

4. The computer system of claim 1, wherein in the windowed mode, each card comprises a user interface for a corresponding application activity, and wherein the user interface is adapted to display content from operation of the corresponding application activity and to receive input for the corresponding application activity.

5. The system of claim 1, wherein in the windowed mode, at least one of the first card or the second card comprises a static representation of a user interface for a corresponding activity.

6. The computer system of claim 1, wherein the processor is configured to operate the computer system in a third mode, in which the second card and a third card are stacked, the second card and the third card both corresponding to the second application.

7. The computer system of claim 1, wherein in the windowed mode, the processor provides only one of the first card or the second card as having focus, and wherein in the windowed mode, the processor responds to directional contact along the first direction on the touch-sensitive display screen by selecting which of the first card or second card is in focus.

8. The computer system of claim 1, wherein the computer system is implemented on a mobile computing device.

9. The computer system of claim 8, wherein the mobile computing device is a handheld device.

10. The computer system of claim 1, wherein the first direction is substantially vertical on the touch-sensitive display screen, and wherein the second direction is substantially horizontal on the touch-sensitive display screen.

11. The computer system of claim 1, wherein while operating the computing device in the windowed mode, the processor is further configured to respond to the directional contact of moving the first card or the second card along the second direction by shifting the other of at least the first card or the second card to fill a void left by the dismissed first card or second card.

12. A computer-implemented method for operating a computing device, the method being implemented by one or more processors and comprising:
   operating the computing device in a full-screen mode in which at least a first application and a second application are operated concurrently and in which a user interface is displayed on a touch-sensitive display screen for only one of either the first application or the second application;
   while operating the computing device in the full screen mode, receiving a user input via a physical button of the computing device;
   in response to receiving the user input via the physical button, transitioning from operating the computing device in the full-screen mode to operating the computing device in a windowed mode in which (i) at least a first card is displayed on the touch-sensitive display screen, the first card corresponding to the first application, and (ii) a first portion of a second card is displayed on the touch-sensitive display screen so that a second portion of the second card is not visible on the touch-sensitive display screen, the second card corresponding to the second application;
   while operating the computing device in the windowed mode:
      responding to a directional contact along a first direction on the touch-sensitive display screen by changing a position of the first card relative to the touch-sensitive display screen in the first direction; and
      responding to a directional contact of moving the first card or the second card along a second direction that is different than the first direction on the touch-sensitive display screen by (i) identifying one of the first card or second card as being selected based on the directional contact along the second direction, and (ii) dismissing the selected first card or second card from the touch-sensitive display screen in the second direction so that the corresponding first application or second application is exited.

13. The method of claim 12, wherein the first direction is substantially horizontal on the touch-sensitive display screen, and wherein the second direction is substantially vertical on the touch-sensitive display screen.

14. The method of claim 12, wherein the first direction is substantially vertical on the touch-sensitive display screen, and wherein the second direction is substantially horizontal on the touch-sensitive display screen.

15. The method of claim 12, wherein while operating the computing device in the windowed mode, responding to the directional contact of moving the first card or the second card along the second direction includes shifting the other of at least the first card or the second card to fill a void left by the dismissed first card or second card.

16. The method of claim 12, wherein in the windowed mode, the computing device is transitioned from operating in the windowed mode to operating in the full-screen mode in response to receiving a tap input on the first card or the second card displayed on the touch-sensitive display screen.

17. A non-transitory computer-storage medium that stores computer program code for operating a computing device, the computer program code being executable by one or more processors to perform operations comprising:
   operating the computing device in a full-screen mode in which a user interface is displayed on a touch-sensitive display screen for only one of either the first application or the second application;
   while operating the computing device in the full screen mode, receiving a user input via a physical button of the computing device;
   in response to receiving the user input via the physical button, transitioning from operating the computing device in the full-screen mode to operating the computing device in a windowed mode in which (i) at least a first card is displayed on the touch-sensitive display screen, the first card corresponding to the first application, and (ii) a first portion of a second card is displayed on the touch-sensitive display screen so that a second portion of the second card is not visible on the touch-sensitive display screen, the second card corresponding to the second application;
   while operating the computing device in the windowed mode:
      responding to a directional contact along a first direction on the touch-sensitive display screen by changing a position of the first card relative to the touch-sensitive display screen in the first direction; and responding to a directional contact of moving the first card or the second card along a second direction that is different than the first direction on the touch-sensitive display screen by (i) identifying one of the first card or second card as being selected based on the directional contact along the second direction, and (ii) dismissing the selected first card or second card from the touch-sensitive display screen in the second direction so that the corresponding first application or second application is exited.

18. The computer-storage medium of claim 17, wherein the first direction is substantially horizontal on the touch-sensitive display screen, and wherein the second direction is substantially vertical on the touch-sensitive display screen.

19. The computer-storage medium of claim 17, wherein the first direction is substantially vertical on the touch-sensitive display screen, and wherein the second direction is substantially horizontal on the touch-sensitive display screen.

20. The computer-storage medium of claim 17, further storing computer program code that is executable by the one or more processors to, while operating the computing device in the windowed mode, respond to the directional contact of moving the first card or the second card along the second direction by shifting the other of at least the first card or the second card to fill a void left by the dismissed first card or second card.

* * * * *